United States Patent
Honda et al.

(10) Patent No.: US 11,939,426 B2
(45) Date of Patent: Mar. 26, 2024

(54) POLYCARBONATE POLYOL AND METHOD FOR PRODUCING SAME, COMPOSITION AND METHOD FOR PRODUCING SAME, URETHANE RESIN AND AQUEOUS URETHANE RESIN DISPERSION

(71) Applicant: TOSOH CORPORATION, Shunan (JP)

(72) Inventors: Kohei Honda, Yokkaichi (JP); Shinji Shigeyasu, Yokkaichi (JP); Takahiro Tanaka, Yokkaichi (JP)

(73) Assignee: TOSOH CORPORATION, Shunan (JP)

( * ) Notice: Subject to any disclaimer, the term of this patent is extended or adjusted under 35 U.S.C. 154(b) by 0 days.

(21) Appl. No.: 18/031,232

(22) PCT Filed: Oct. 15, 2021

(86) PCT No.: PCT/JP2021/038305
§ 371 (c)(1),
(2) Date: Apr. 11, 2023

(87) PCT Pub. No.: WO2022/080491
PCT Pub. Date: Apr. 21, 2022

(65) Prior Publication Data
US 2023/0348670 A1    Nov. 2, 2023

(30) Foreign Application Priority Data

Oct. 16, 2020 (JP) .................. 2020-174917
Mar. 29, 2021 (JP) .................. 2021-056298
Mar. 29, 2021 (JP) .................. 2021-056301
Mar. 29, 2021 (JP) .................. 2021-056304

(51) Int. Cl.
| | |
|---|---|
| *C08G 18/44* | (2006.01) |
| *C08G 18/73* | (2006.01) |
| *C08G 64/02* | (2006.01) |
| *C08G 64/30* | (2006.01) |

(52) U.S. Cl.
CPC ........... *C08G 64/305* (2013.01); *C08G 18/44* (2013.01); *C08G 18/73* (2013.01); *C08G 64/0208* (2013.01)

(58) Field of Classification Search
USPC .......................................... 528/66
See application file for complete search history.

(56) References Cited

U.S. PATENT DOCUMENTS

2011/0152167 A1    6/2011   Hedrick et al.

FOREIGN PATENT DOCUMENTS

| CN | 110028410 A | * | 7/2019 | |
|---|---|---|---|---|
| CN | 110028410 A | | 7/2019 | |
| CN | 110041484 A | | 7/2019 | |
| JP | S57-39650 B2 | | 8/1982 | |
| JP | H03-220233 A | | 9/1991 | |
| JP | 2012-184380 A | | 9/2012 | |
| JP | 2019-035073 A | | 3/2019 | |
| JP | 2019-123871 A | | 7/2019 | |
| JP | 2019123871 A | * | 7/2019 | ......... C08G 18/3206 |
| TW | I469999 B | | 1/2015 | |

OTHER PUBLICATIONS

JP-2019123871-A Machine Translation (Year: 2019).*
CN-110028410-A Machine Translation (Year: 2019).*
International Preliminary Report on Patentability dated Apr. 27, 2023 for International Application No. PCT/JP2021/038305, 6 pages.
International Search Report dated Jan. 11, 2022, for International Application No. PCT/JP2021/038305, with translation, 5 pages.

\* cited by examiner

*Primary Examiner* — Terressa Boykin
(74) *Attorney, Agent, or Firm* — Squire Patton Boggs (US) LLP

(57) ABSTRACT

A polycarbonate polyol represented by the following Formula (A-1):

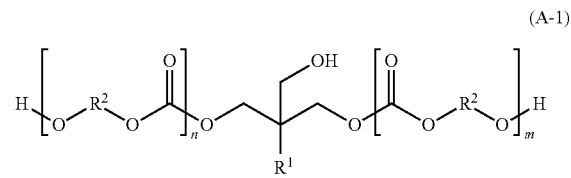

(A-1)

[in Formula (A-1), $R^1$ represents a hydrogen atom, an alkyl group or a hydroxyalkyl group, $R^2$ represents an alkanediyl group, n and m each represent an integer of 1 or more; and a plurality of $R^2$'s may be the same as or different from each other].

15 Claims, 9 Drawing Sheets

POLYCARBONATE POLYOL AND METHOD FOR PRODUCING SAME, COMPOSITION AND METHOD FOR PRODUCING SAME, URETHANE RESIN AND AQUEOUS URETHANE RESIN DISPERSION

CROSS-REFERENCE TO RELATED APPLICATIONS

This application is a National Stage filing under 35 U.S.C. § 371 of International Patent Application No. PCT/JP2021/038305, filed Oct. 15, 2021, which claims the benefit of and priority to Japanese Patent Application No. 2020-174917, filed Oct. 16, 2020, Japanese Patent Application No. 2021-056298, filed Mar. 29, 2021, Japanese Patent Application No. 2021-056301, filed Mar. 29, 2021, and Japanese Patent Application No. 2021-056304, filed Mar. 29, 2021, the contents of all of which are hereby incorporated by reference in their entireties for all purposes.

TECHNICAL FIELD

The present invention relates to a polycarbonate polyol and a method of producing the same, a composition and a method of producing the same, a urethane resin, and an aqueous urethane resin dispersion.

BACKGROUND ART

Similar to polyester polyols, polyether polyols and the like, polycarbonate polyols are beneficial as raw materials for producing urethane resins (also called polyurethane resins) by reaction with polyisocyanate compounds, and are beneficial as raw materials for adhesives and paints.

Since a polyester polyol has an ester bond, a urethane resin obtained from a polyester polyol has a disadvantage of inferior hydrolysis resistance. In addition, since a polyether polyol has an ether bond, a urethane resin obtained from a polyether polyol has a disadvantage of inferior weather resistance and heat resistance. On the other hand, a urethane resin obtained from a polycarbonate polyol tends to have excellent durability (heat resistance, weather resistance, hydrolysis resistance, chemical resistance, and the like).

A polycarbonate polyol is generally produced by reacting a carbonate ester with a diol in the presence of a transesterification catalyst (transesterification reaction).

So far, polycarbonate polyols having various structures have been proposed according to their purpose. For example, Patent Literature 1 and 2 propose polycarbonate polyols obtained by a transesterification reaction between a polycarbonate diol and a triol compound and/or a tetraol compound.

CITATION LIST

Patent Literature

[Patent Literature 1] Japanese Unexamined Patent Publication No. H3-220233
[Patent Literature 2] Japanese Unexamined Patent Publication No. 2012-184380

SUMMARY OF INVENTION

Technical Problem

An object of the present invention is to provide a novel polycarbonate polyol that is beneficial as a raw material such as a urethane resin and a method of producing the same, and a urethane resin made from the polycarbonate polyol as a raw material. Another object of the present invention is to provide a composition containing the polycarbonate polyol and a method of producing the same, and a urethane resin made from the composition as a raw material. Still another object of the present invention is to provide a composition that contributes to formation of a urethane resin having a favorable tensile strength, elongation rate and texture, and having excellent durability. Yet another object of the present invention is to provide a composition that contributes to formation of a urethane resin having an excellent handleability, a favorable elongation rate and texture, and having excellent durability. Yet another object of the present invention is to provide an aqueous urethane resin dispersion containing a urethane resin having an acid group.

Solution to Problem

The present invention provides the following [1] to [23].
[1] A polycarbonate polyol represented by the following Formula (A-1):

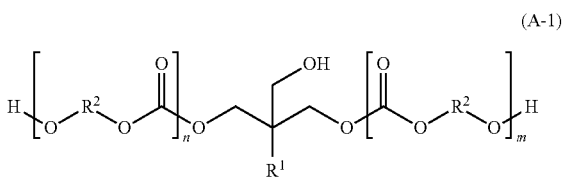

[in Formula (A-1), $R^1$ represents a hydrogen atom, an alkyl group or a hydroxyalkyl group, $R^2$ represents an alkanediyl group, n and m each represent an integer of 1 or more; and a plurality of $R^2$'s may be the same as or different from each other].
[2] The polycarbonate polyol according to [1], wherein all of $R^2$'s are linear alkanediyl groups.
[3] The polycarbonate polyol according to claim [1], wherein at least one of $R^2$'s is a branched alkanediyl group.
[4] The polycarbonate polyol according to any one of [1] to [3], which contains two or more types of alkanediyl groups for $R^2$.
[5] A composition containing the polycarbonate polyol according to any one of [1] to [4] and a multivalent alcohol represented by the following Formula (B):

[in Formula (B), $R^1$ has the same meaning as described above]
[6] The composition according to [5], wherein, when a total number of moles of the group represented by the following Formula (a-1) contained in the composition is $C_{A1}$ and a total number of moles of the multivalent alcohol contained in the composition is $C_B$, the molar ratio ($C_{A1}/C_B$) is 0.1 to 150:

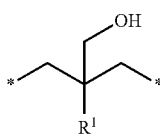

(a-1)

[in Formula (a-1), * indicates a bond to a carbonate group].

[7] The composition according to [5] or [6], further containing a compound (A-2) represented by the following Formula (A-2) and a compound (A-3) represented by the following Formula (A-3):

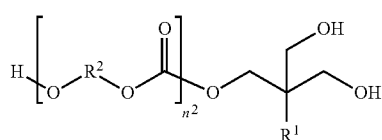

(A-2)

[in Formula (A-2), $R^1$ and $R^2$ have the same meanings as described above, $n^2$ represents an integer of 1 or more; and when there are 2 or more $n^2$'s, the plurality of $R^2$'s may be the same as or different from each other], and

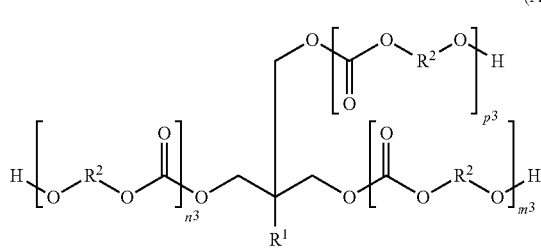

(A-3)

[in Formula (A-3), $R^1$ and $R^2$ have the same meanings as described above, $n^3$, $m^3$ and $p^3$ each represent an integer of 1 or more; and a plurality of $R^2$'s may be the same as or different from each other].

[8] The composition according to any one of [5] to [7], wherein, when a total number of moles of the group represented by the following Formula (a-1) contained in the composition is $C_{A1}$ and a total number of moles of the group represented by the following Formula (I) contained in the composition is $C_T$, the molar ratio $(C_{A1}/C_T)$ is 0.10 to 0.99:

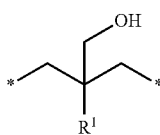

(a-1)

[in Formula (a-1), * indicates a bond to a carbonate group],

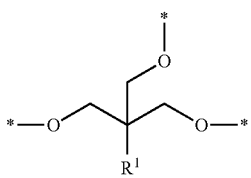

(I)

[in Formula (I), $R^1$ has the same meaning as described above, and * indicates a bond].

[9] The composition according to any one of [5] to [8], wherein, when a total number of moles of the multivalent alcohol contained in the composition is $C_B$, and a total number of moles of the groups represented by the following Formula (I) contained in the composition is $C_T$, the molar ratio $(C_B/C_T)$ is 0.001 to 0.900:

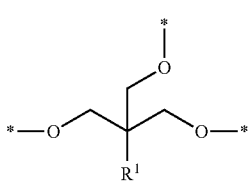

(I)

[in Formula (I), $R^1$ has the same meaning as described above, and * indicates a bond].

[10] The composition according to any one of [5] to [9], further containing lithium acetylacetonate.

[11] A method of producing a polycarbonate polyol, including heating a mixed solution containing a multivalent alcohol represented by the following Formula (B), a diol represented by the following Formula (D), a carbonate ester, and a transesterification catalyst to perform a reflux reaction while removing an alcohol derived from the carbonate ester from a reaction system, thereby obtaining the polycarbonate polyol according to any one of [1] to [4]:

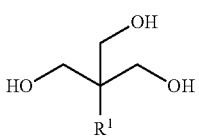

(B)

[in Formula (B), $R^1$ has the same meaning as described above], and

HO—$R^2$—OH (D)

[in Formula (D), $R^2$ has the same meaning as described above]

[12] A method of producing a composition, including heating a mixed solution containing a multivalent alcohol represented by the following Formula (B), a diol represented by the following Formula (D), a carbonate ester, and a transesterification catalyst to perform a reflux reaction while removing an alcohol derived from the carbonate ester from a reaction system, thereby obtaining the composition according to any one of [5] to [10]:

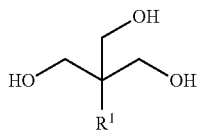
(B)

[in Formula (B), R$^1$ has the same meaning as described above], and

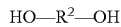
(D)

[in Formula (D), R$^2$ has the same meaning as described above].

[13] The production method according to [11] or [12], wherein the heating of the mixed solution includes heating at a temperature T1 under a pressure of 101.325 kPa±20.000 kPa, and then heating at a temperature T2 under a reduced pressure of 10.000 kPa or less, wherein the temperatures T1 and T2 satisfy the relationship of the following Formulae (α) and (β), and wherein, in the reflux reaction, an alcohol derived from the carbonate ester is distilled off at 120° C. or lower and removed from a reaction system:

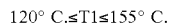
(α)

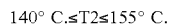
(β)

[14] The production method according to any one of [11] to [13], wherein the content of the transesterification catalyst in the mixed solution is 0.001 to 0.050 parts by mass with respect to a total amount of 100 parts by mass of the multivalent alcohol, the diol and the carbonate ester in the mixed solution.

[15] The production method according to any one of [11] to [14], wherein the transesterification catalyst contains lithium acetylacetonate.

[16] A urethane resin which is a polycondensate of a polyol component and a polyisocyanate component or a crosslinked product thereof, wherein the polyol component contains the polycarbonate polyol according to any one of [1] to [4].

[17] The urethane resin according to [16], wherein the polyol component further includes a multivalent alcohol represented by the following Formula (B):

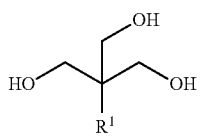
(B)

[in Formula (B), R$^1$ has the same meaning as described above]

[18] The urethane resin according to [17], wherein, when a total number of moles of the group represented by the following Formula (a-1) contained in the polyol component is $C_{A1}$ and a total number of moles of the multivalent alcohol contained in the polyol component is $C_B$, the molar ratio ($C_{A1}/C_B$) is 0.1 to 150:

(a-1)

[in Formula (a-1), * indicates a bond to a carbonate group].

[19] The urethane resin according to [17] or [18], wherein the polyol component further includes a compound (A-2) represented by the following Formula (A-2) and a compound (A-3) represented by the following Formula (A-3):

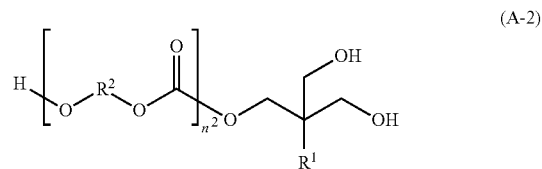
(A-2)

[in Formula (A-2), R$^1$ and R$^2$ have the same meanings as described above, n$^2$ represents an integer of 1 or more; and when there are 2 or more n$^2$'s, the plurality of R$^2$'s may be the same as or different from each other], and

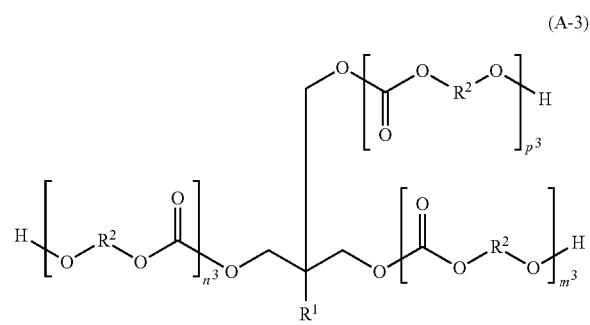
(A-3)

[in Formula (A-3), R$^1$ and R$^2$ have the same meanings as described above, n$^3$, m$^3$ and p$^3$ each represent an integer of 1 or more; and a plurality of R$^2$'s may be the same as or different from each other].

[20] The urethane resin according to any one of [17] to [19], wherein, when a total number of moles of the group represented by the following Formula (a-1) contained in the polyol component is $C_{A1}$ and a total number of moles of the group represented by the following Formula (I) contained in the polyol component is $C_T$, the molar ratio ($C_{A1}/C_T$) is 0.10 to 0.99:

(a-1)

[in Formula (a-1), * indicates a bond to a carbonate group], and

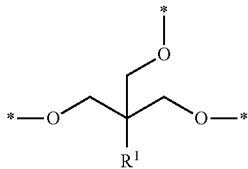

(I)

[in Formula (I), $R^1$ has the same meaning as described above, and * indicates a bond].

[21] The urethane resin according to any one of [17] to [20],
wherein, when a total number of moles of the multivalent alcohol contained in the polyol component is $C_B$ and a total number of moles of the group represented by the following Formula (I) contained in the polyol component is $C_T$, the molar ratio ($C_B/C_T$) is 0.001 to 0.900:

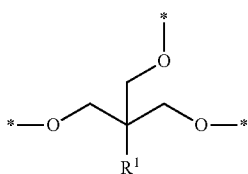

(I)

[in Formula (I), $R^1$ has the same meaning as described above, and * indicates a bond].

[22] The urethane resin according to any one of [16] to [21],
wherein the polyol component further contains a polyol having an acid group.

[23] An aqueous urethane resin dispersion containing an aqueous medium, and the urethane resin according to [22] dispersed in the aqueous medium or a neutralized product thereof.

Advantageous Effects of Invention

According to the present invention, it is possible to provide a novel polycarbonate polyol that is beneficial as a raw material such as a urethane resin and a method of producing the same, and a urethane resin made from the polycarbonate polyol as a raw material. According to the present invention, it is also possible to provide a composition containing the polycarbonate polyol and a method of producing the same, and a urethane resin made from the composition as a raw material. According to the present invention, it is also possible to provide a composition that contributes to formation of a urethane resin having a favorable tensile strength, elongation rate and texture, and having excellent durability. According to the present invention, it is also possible to provide a composition that contributes to formation of a urethane resin having an excellent handleability, a favorable elongation rate and texture, and having excellent durability. According to the present invention, it is also possible to provide an aqueous urethane resin dispersion containing a urethane resin having an acid group.

DESCRIPTION OF EMBODIMENTS

Figure 1:
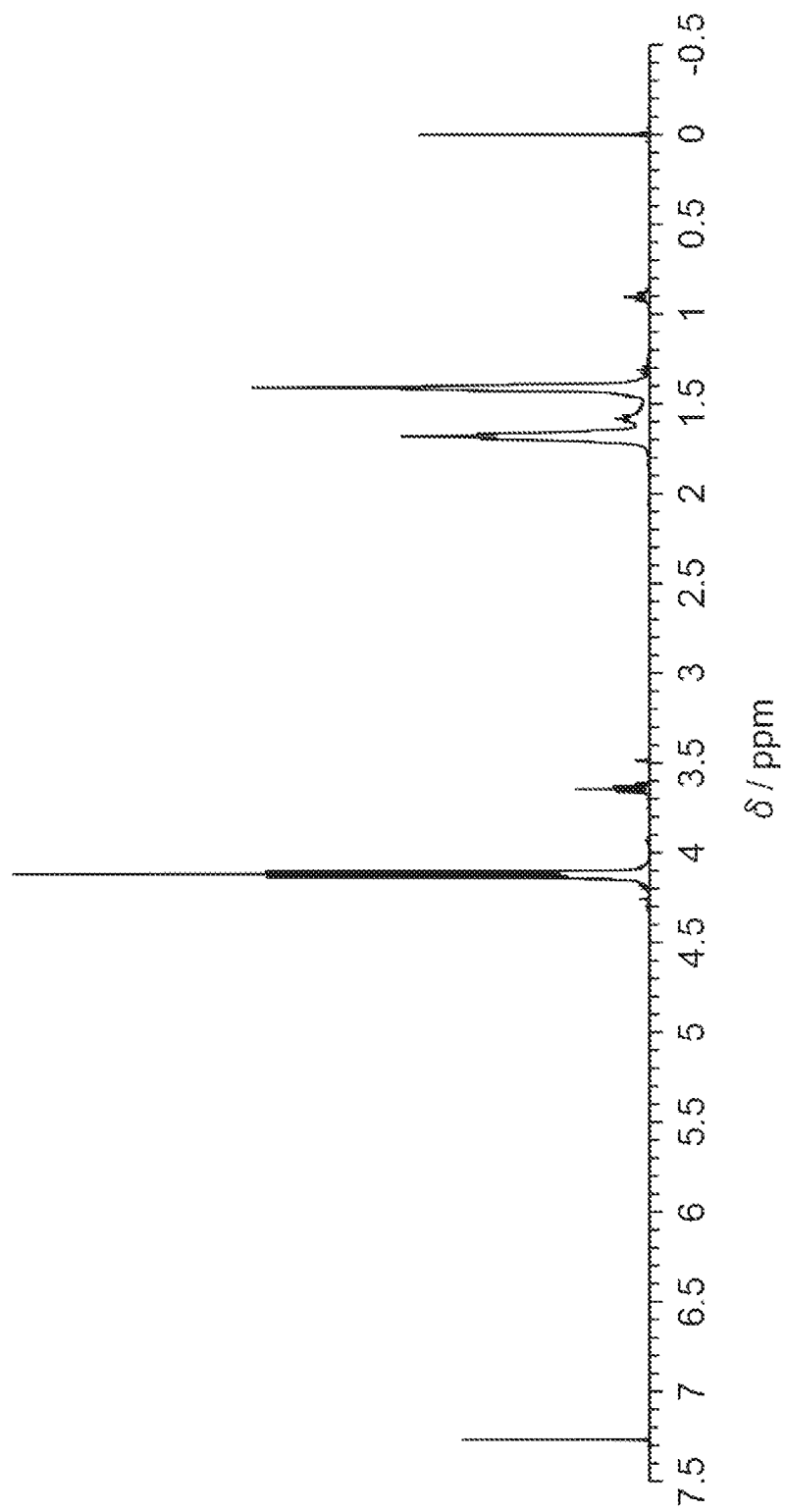
FIG. 1 is a diagram showing an $^1$H-NMR spectrum of a composition containing a polycarbonate polyol obtained in Example 2A.

Hereinafter, embodiments of the present invention will be described in detail. Here, in this specification, when a numerical range is indicated using "to," the range includes numerical values stated before and after "to" as a minimum value and a maximum value. The minimum value or maximum value of the numerical range indicated using "to" can be arbitrarily combined with the maximum value or the minimum value of other numerical ranges indicated using "to." In addition, the upper limit values and the lower limit values described individually can be arbitrarily combined.

<Polycarbonate Polyol>

A polycarbonate polyol of one embodiment is a compound represented by the following Formula (A-1) (hereinafter also referred to as a "compound (A-1)").

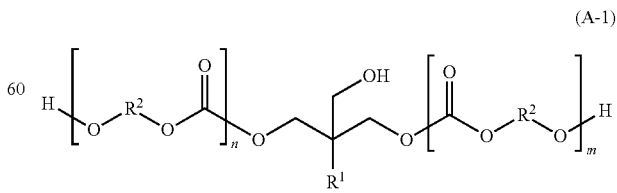

(A-1)

[in Formula (A-1), $R^1$ represents a hydrogen atom, an alkyl group or a hydroxyalkyl group, $R^2$ represents an alkanediyl group, n and m each represent an integer of 1 or more; and a plurality of $R^2$'s may be the same as or different from each other].

The alkyl group and the hydroxyalkyl group represented by R' may be linear or branched. The number of carbon atoms of the alkyl group and the hydroxyalkyl group is, for example, 1 to 5, and may be 1 to 4 or 1 to 2. Specific examples of alkyl groups and hydroxyalkyl groups include a methyl group, ethyl group, propyl group, butyl group, pentyl group, hydroxymethyl group, hydroxyethyl group, hydroxypropyl group, and hydroxybutyl group. $R^1$ is preferably an alkyl group or hydroxyalkyl group, and more preferably an alkyl group or hydroxyalkyl group having 1 to 2 carbon atoms.

The alkanediyl group represented by $R^2$ may be linear or branched. If there are two or more types of $R^2$'s, all may be a linear alkanediyl group or branched alkanediyl group, or some may be a linear alkanediyl group, and the others may be a branched alkanediyl group. The number of carbon atoms of the alkanediyl group is, for example, 2 to 10. Specific examples of alkanediyl groups include an ethanediyl group, 1,2-propanediyl group, 1,3-propanediyl group, 1,2-butanedidiyl group, 1,3-butanediyl group, 1,4-butanediyl group, 1,5-pentanediyl group, 2,2-dimethyl-1,3-propanediyl group, 1,6-hexanediyl group, 3-methyl-1,5-pentanediyl group, 1,8-octanediyl group, 2-ethyl-1,6-hexanediyl group, 1,9-nonanediyl group, 2-methyloctane-1,8-diyl group, and 2-butyl-2-ethyl-1,3-propanediyl group.

n and m each may be 1 to 65, 2 to 60 or 2 to 55.

The number average molecular weight of the compound (A-1) is, for example, 200 to 6,000. Here, the number average molecular weight is a number average molecular weight in terms of bifunctional polyoxypropylene polyol measured using Gel Permeation Chromatography (GPC).

The hydroxyl value of the compound (A-1) is, for example, 30 to 800 mg KOH/g. Here, the hydroxyl value is the number of milligrams (mg) of potassium hydroxide equivalent to hydroxy groups in 1 g of the compound (A-1), and is measured according to JIS K1557-1.

The state of the compound (A-1) is not particularly limited, and may be a solid at 25° C. or a liquid at 25° C. The compound (A-1) may be a liquid at a low temperature (for example, 5° C.). The state of the compound (A-1) can be changed depending on the type (the number of carbon atoms, the presence of branching, and the like) of the alkanediyl group contained as $R^2$ in the compound (A-1), the hydroxyl value of the compound (A-1), and the like. For example, when there are a plurality of types of alkanediyl groups, when the alkanediyl group is branched, and when the hydroxyl value of the compound (A-1) is high, the compound (A-1) is likely to be a liquid at 25° C.

Hereinafter, the compound (A-1) will be described in more detail separately with reference to a plurality of embodiments (first to third embodiments).

First Embodiment

In the first embodiment, the compound (A-1) contains only linear alkanediyl groups for $R^2$. That is, all of $R^2$'s are a linear alkanediyl group. Since the compound (A-1) contains only a linear alkanediyl group for $R^2$, it is likely to be a solid at 25° C.

In the first embodiment, it is preferable that the compound (A-1) contain only one type of linear alkanediyl group for $R^2$. In this case, the compound (A-1) is highly likely to be a solid at 25° C.

The number of carbon atoms of the linear alkanediyl group is preferably 2 to 10, more preferably 2 to 9, and still more preferably 4 to 9. Preferable examples of linear alkanediyl groups include a 1,4-butanediyl group, 1,5-pentanediyl group, 1,6-hexanediyl group and 1,9-nonanediyl group.

The number average molecular weight of the compound (A-1) of the first embodiment is preferably 200 to 6,000, and may be 300 to 5,000 or 500 to 4,000.

The hydroxyl value of the compound (A-1) of the first embodiment is preferably 30 to 800 mg KOH/g, and may be 40 to 700 mg KOH/g or 50 to 600 mg KOH/g.

Second Embodiment

In the second embodiment, the compound (A-1) contains two or more types of alkanediyl groups for $R^2$. Since the compound (A-1) contains two or more types of alkanediyl groups for $R^2$, it is likely to be a liquid at 25° C.

In the second embodiment, the compound (A-1) preferably contains only a linear alkanediyl group for $R^2$ so that a urethane resin having favorable tensile strength, elongation rate and texture and excellent durability is easily formed when used as a raw material for a urethane resin. Examples of preferable combinations of alkanediyl groups include a combination of two or more alkanediyl groups having 2 to 10 carbon atoms. More preferable combinations of alkanediyl groups include combinations of 1,6-hexanediol and at least one selected from the group consisting of 1,4-butanediol, 1,5-pentanediol and 1,9-nonanediol.

In the second embodiment, the ratio of the number of moles of 1,6-hexanediyl groups to the total number of moles of alkanediyl groups contained as $R^2$ in the compound (A-1) is preferably 0.30 or more (for example, 0.30 to 0.95), more preferably 0.40 or more (for example, 0.40 to 0.95), and still more preferably 0.50 or more (for example, 0.50 to 0.90 or 0.50 to 0.80) so that a urethane resin having favorable tensile strength, elongation rate and texture and excellent durability is easily formed when used as a raw material for a urethane resin.

The number average molecular weight of the compound (A-1) of the second embodiment is preferably 200 to 6,000, and may be 300 to 5,000 or 500 to 4,000.

The hydroxyl value of the compound (A-1) of the second embodiment is preferably 30 to 800 mg KOH/g, and may be 40 to 700 mg KOH/g or 50 to 600 mg KOH/g.

Third Embodiment

In the third embodiment, the compound (A-1) contains a branched alkanediyl group for $R^2$. Since the compound (A-1) of the third embodiment contains a branched alkanediyl group for $R^2$, it is likely to be a liquid at 25° C.

In the third embodiment, the compound (A-1) may contain two or more types of alkanediyl groups for $R^2$. All of the two or more types of alkanediyl groups may be branched alkanediyl groups, but it is preferable that some are linear alkanediyl groups so that a urethane resin having an excellent handleability, a favorable elongation rate and texture, and excellent durability is easily formed when used as a raw material for a urethane resin. In this case, the ratio of the number of moles of the branched alkanediyl group to the total number of moles of the alkanediyl group contained as $R^2$ in the compound (A-1) is preferably 0.10 to 1, more preferably 0.20 to 0.90, and still more preferably 0.30 to 0.70.

The number of carbon atoms of the branched alkanediyl group is preferably 2 to 10, more preferably 2 to 9, and still more preferably 4 to 9. The number of carbon atoms of the main chain (a linear chain having the largest number of carbon atoms) of the branched alkanediyl group is preferably 2 to 9, more preferably 3 to 9, and still more preferably 4 to 8. Preferable examples of branched alkanediyl groups include a 3-methylpentane-1,5-diyl group and 2-methyl-1,8-octanediyl group.

The number of carbon atoms of the linear alkanediyl group is preferably 2 to 10, more preferably 2 to 9, and still more preferably 4 to 9. Preferable examples of linear alkanediyl groups include a 1,4-butanediyl group, 1,5-pentanediyl group, 1,6-hexanediyl group and 1,9-nonanediyl group.

In the third embodiment, the ratio of the number of moles of 1,6-hexanediyl groups to the total number of moles of alkanediyl groups contained as $R^2$ in the compound (A-1) is preferably 0 or more (for example, 0 to 0.95), more preferably 0.10 or more (for example, 0.10 to 0.95), still more preferably 0.3 or more (for example, 0.3 to 0.90), and particularly preferably 0.50 or more (for example, 0.50 to 0.80) so that a urethane resin having an excellent handleability, a favorable elongation rate and texture, and excellent durability is easily formed when used as a raw material for a urethane resin.

The number average molecular weight of the compound (A-1) of the third embodiment is preferably 200 to 6,000, and may be 300 to 5,000 or 500 to 4,000.

The hydroxyl value of the compound (A-1) of the third embodiment is preferably 30 to 800 mg KOH/g, and may be 40 to 700 mg KOH/g or 50 to 600 mg KOH/g.

The polycarbonate polyol (compound (A-1)) described above is, for example, a reaction product of a multivalent alcohol represented by the following Formula (B) (hereinafter also referred to as a "multivalent alcohol (B)"), a diol represented by the following Formula (D) (hereinafter also referred to as a "diol (D)"), and a carbonate ester, and is obtained by reacting two of hydroxy groups of the multivalent alcohol (B) with a reaction product of a carbonate ester or carbonate ester and the diol (D).

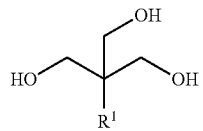

(B)

[in Formula (B), $R^1$ has the same meaning as described above].

HO—$R^2$—OH (D)

[in Formula (D), $R^2$ has the same meaning as described above].

Specific examples of multivalent alcohols (B) include trimethylolpropane, trimethylolethane and pentaerythritol. These may be used alone or two or more thereof may be used in combination.

Specific examples of diols (D) include ethylene glycol, 1,2-propanediol, 1,3-propanediol, 1,2-butanediol, 1,3-butanediol, 1,4-butanediol, 1,5-pentanediol, 2,2-dimethyl-1,3-propanediol, 1,6-hexanediol, 3-methyl-1,5-pentanediol, 1,8-octanediol, 2-ethyl-1,6-hexanediol, 1,9-nonanediol, 2-methyloctane-1,8-diol and 2-butyl-2-ethyl-1,3-propanediol. These may be used alone or two or more thereof may be used in combination.

Examples of carbonate esters include dimethyl carbonate, diethyl carbonate, methyl ethyl carbonate, dipropyl carbonate, dibutyl carbonate, diphenyl carbonate, ethylene carbonate, trimethylene carbonate, and 1,2-propylene carbonate. These may be used alone or two or more thereof may be used in combination. In consideration of ease of availability, easy setting of conditions for the polymerization reaction and the like, it is preferable to use at least one selected from the group consisting of dimethyl carbonate, diethyl carbonate, diphenyl carbonate, dibutyl carbonate and ethylene carbonate.

At least one of the hydroxy groups of the compound (A-1) is, for example, a hydroxy group derived from the multivalent alcohol (B) (an unreacted hydroxy group among hydroxy groups of the multivalent alcohol (B)). This hydroxy group tends to have lower reactivity than a hydroxy group derived from the diol (D) due to the influence of steric hindrance. In addition, since the length from the hydroxy group derived from the multivalent alcohol (B) to the branch (carbon atom bonded to R') is shorter than the length from the hydroxy group derived from the diol (D) to the branch, the urethane resin obtained by reacting the compound (A-1) with an isocyanate compound tends to have higher rigidity. The compound (A-1) is expected to be used as a raw material for various urethane resins using differences in the reactivity of the hydroxy group and in the length of the hydroxy group to the branch.

(Composition)

A composition of one embodiment contains the polycarbonate polyol (compound (A-1)) of the above embodiment and a multivalent alcohol (B).

The multivalent alcohol (B) has the same meaning as described above, and the alkanediyl group $R^2$ of the multivalent alcohol (B) may be the same as the alkanediyl group $R^2$ of the compound (A-1). When the compound (A-1) contains two or more types of alkanediyl groups for $R^2$, there may be two or more types of multivalent alcohols (B) contained in the composition. In this case, the combination of alkanediyl groups contained as $R^2$ in two or more types of multivalent alcohols (B) may be the same as the combination of alkanediyl groups contained as $R^2$ in the compound (A-1).

When a total number of moles of the group represented by the following Formula (a-1) contained in the composition is $C_{A1}$ and a total number of moles of the multivalent alcohol (B) contained in the composition is $C_B$, the molar ratio ($C_{A1}/C_B$) may be 0.1 to 150. If the molar ratio ($C_{A1}/C_B$) is within the above range, when the composition is used as a raw material for a urethane resin, a urethane resin having a favorable elongation rate and texture, and having excellent durability tends to be easily formed.

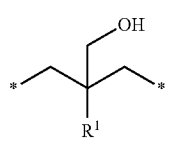

(a-1)

[in Formula (a-1), * indicates a bond to a carbonate group (—OC(O)O—)] Here, even if one group has the same structure as the group represented by Formula (a-1), when * is bonded to a group (for example, a hydroxy group (—OH))

other than the carbonate group, the group is not included in the group represented by Formula (a-1).

For example, the molar ratio ($C_{A1}/C_B$) can be determined from $^1$H-NMR measurement of the composition using deuterated chloroform as a solvent and tetramethylsilane as a reference substance, and the integral value of the signal of the $^1$H-NMR spectrum obtained by the measurement. Specifically, for example, the molar ratio ($C_{A1}/C_B$) can be calculated from the integral value $\Delta_{S1}$ (2 mol of hydrogen atoms) of the signal (S1) of methylene positioned next to the hydroxy group of the group represented by Formula (a-1) and the integral value $\Delta_{S2}$ (6 mol of hydrogen atoms) of the signal (S2) of methylene positioned next to the hydroxy group of the multivalent alcohol (B). In this case, the molar ratio ($C_{A1}/C_B$) can be regarded as a value three times ($3 \times \Delta_{S1}/\Delta_{S2}$) the ratio of the integral value $\Delta_{S1}$ of the signal (S1) and the integral value $\Delta_{S2}$ of the signal (S2).

The composition may further contain at least one of a polycarbonate polyol represented by the following Formula (A-2) (hereinafter referred to as a "compound (A-2)") and a polycarbonate polyol represented by the following Formula (A-3) (hereinafter referred to as a "compound (A-3)").

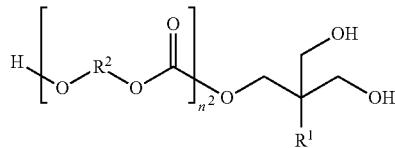

(A-2)

[in Formula (A-2), $R^1$ and $R^2$ have the same meanings as described above, $n^2$ represents an integer of 1 or more; and when there are 2 or more $n^2$'s, the plurality of $R^2$'s may be the same as or different from each other].

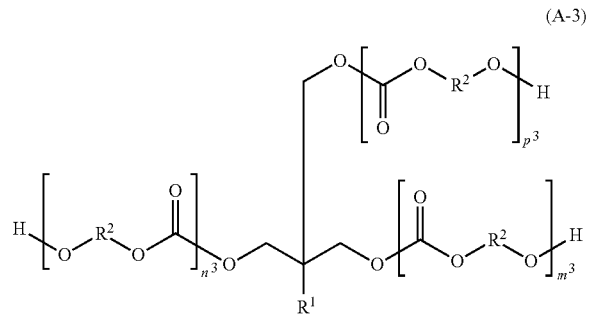

(A-3)

[in Formula (A-3), $R^1$ and $R^2$ have the same meanings as described above, $n^3$, $m^3$ and $p^3$ each represent an integer of 1 or more; and a plurality of $R^2$'s may be the same as or different from each other].

The atom or group contained as $R^1$ in the compound (A-2) may be the same as the atom or group contained as $R^1$ in the compound (A-1). Similarly, the atom or group contained as $R^1$ in the compound (A-3) may be the same as the atom or group contained as $R^1$ in the compound (A-1).

The alkanediyl group contained as $R^2$ in the compound (A-2) may be the same as the alkanediyl group contained as $R^2$ in the compound (A-1). Similarly, the alkanediyl group contained as $R^2$ in the compound (A-3) may be the same as the alkanediyl group contained as $R^2$ in the compound (A-1). When the compound (A-1) contains two or more types of alkanediyl groups for $R^2$, the compound (A-2) and the compound (A-3) may also contain two or more types of alkanediyl groups for $R^2$. In this case, the combination of alkanediyl groups contained as $R^2$ in the compound (A-2) and the compound (A-3) may be the same as the combination of alkanediyl groups contained as $R^2$ in the compound (A-1).

$n^2$, $n^3$, $m^3$ and $p^3$ each may be 1 to 65, 2 to 60 or 3 to 50.

When a total number of moles of the group represented by Formula (a-1) contained in the composition is $C_{A1}$, a total number of moles of the multivalent alcohol contained in the composition is $C_B$, and a total number of moles of the group represented by the following Formula (I) contained in the composition is $C_T$, the molar ratio ($C_{A1}/C_T$) may be 0.10 to 0.99, and the molar ratio ($C_B/C_T$) may be 0.001 to 0.900. If the molar ratio ($C_{A1}/C_T$) and the molar ratio ($C_B/C_T$) are each within the above range, when the composition is used as a raw material for a urethane resin, a urethane resin having a favorable elongation rate and texture, and having excellent durability tends to be easily formed.

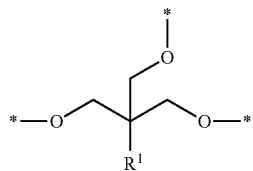

(I)

[In Formula (I), $R^1$ has the same meaning as described above, and * indicates a bond].

Like the molar ratio ($C_{A1}/C_B$), the molar ratio ($C_{A1}/C_T$) and the molar ratio ($C_B/C_T$) can be determined, for example, from $^1$H-NMR measurement of the composition using deuterated chloroform as a solvent and tetramethylsilane as a reference substance, and the integral value of the signal of the $^1$H-NMR spectrum obtained by the measurement. Specifically, for example, when $R^1$ of Formula (I) is an alkyl group, the molar ratio ($C_{A1}/C_T$) can be calculated from the ratio of the integral value $\Delta_{S1}$ (2 mol of hydrogen atoms) of the signal (S1) and the integral value $\Delta_{S3}$ (3 mol of hydrogen atoms) of the signal (S3) of the terminal methyl of $R^1$ (alkyl group) of Formula (I), and the molar ratio ($C_B/C_T$) can be calculated from the ratio of the integral value $\Delta_{S2}$ (6 mol of hydrogen atoms) of the signal (S2) and the integral value $\Delta_{S3}$ (3 mol of hydrogen atoms) of the signal (S3). In this case, the molar ratio ($C_{A1}/C_T$) can be regarded as a value 1.5 times ($1.5 \times \Delta_{S1}/\Delta_{S3}$) the ratio of the integral value $\Delta_{S1}$ of the signal (S1) and the integral value $\Delta_{S3}$ of the signal (S3), and the molar ratio ($C_B/C_T$) can be regarded as a value 0.5 times ($0.5 \times \Delta_{S2}/\Delta_{S3}$) the ratio of the integral value $\Delta_{S2}$ of the signal (S2) and the integral value $\Delta_{S3}$ of the signal (S3).

The composition may further contain, for example, the diol (D), the carbonate ester, a polycarbonate diol, which is a reaction product of the diol (D) and the carbonate ester, and the like. However, the composition preferably contains a compound having a group represented by Formula (I) (compounds (A-1) to (A-3), the multivalent alcohol (B) and the like) as a main component. Here, the main component is a component (component group) having the largest mass fraction. The content of the diol (D) based on the total mass of the composition may be 20 to 60 mass %. The content of the carbonate ester based on the total mass of the composition may be 20 to 60 mass %. The content of the polycarbonate diol based on the total mass of the composition may be 20 to 80 mass %.

The polycarbonate diol that can be included in the composition is represented by, for example, the following Formula (E).

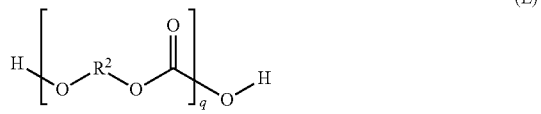

[in Formula (E), $R^2$ has the same meaning as described above, and q represents an integer of 1 or more (for example, 1 to 60)].

When the polycarbonate diol represented by Formula (E) (hereinafter referred to as a "polycarbonate diol (E)") is contained, if the proportion of a compound having a large value of q indicating the degree of polymerization in the total amount of the polycarbonate diol (E) is larger, the texture property tends to become better. This tendency becomes significant as the proportion of 1,6-hexanediyl group in 1,4-butanediyl group, 1,5-pentanediyl group and 1,6-hexanediyl group contained as $R^2$ is larger, and as the number average molecular weight of the polycarbonate diol (E) is larger. This proportion can be confirmed, for example, by comparing peaks corresponding to respective components of the LC spectrum obtained by LC-MS measurement using reversed-phase chromatography. For example, among the peaks observed in the LC spectrum, when the maximum intensity of the peak corresponding to the polycarbonate diol (E) in which q is 3 is P3, the maximum intensity of the peak corresponding to the polycarbonate diol (E) in which q is 4 is P4, and the maximum intensity of the peak corresponding to the polycarbonate diol (E) in which q is 5 is P5, the ratio of P3 to the sum of P3, P4 and P5 (P3/[P3+P4+P5]) is preferably 0.1 to 0.75, more preferably 0.15 to 0.50, and still more preferably 0.20 to 0.40. The ratio of P5 to the sum of P3, P4 and P5 (P5/[P3+P4+P5]) is preferably 0.1 to 0.70, more preferably 0.15 to 0.50, and still more preferably 0.2 to 0.40. If the P3/(P3+P4+P5) and the P5/(P3+P4+P5) are within the above range, when the composition is used as a raw material for a urethane resin, a urethane resin having particularly favorable texture tends to be easily formed. In addition, if P5/(P3+P4+P5) is 0.70 or less, the decoration tends to be easily retained when the urethane resin is peeled off from the release paper having a decoration shape. Here, in the LC-MS measurement, a gradient method is used. In addition the baseline is kept constant by reducing the strength of a specimen sample to the strength of a blank sample (without a specimen). Therefore, it is possible to accurately calculate respective peak intensities. In addition, in order to accurately compare respective peak intensities, each peak intensity other than the maximum intensity is calculated by setting the maximum value of the peak intensity in P3 to P5 to 1. The correspondence relationship between peaks and compounds can be confirmed by, for example, performing MS measurement (device: Bruker Daltonics microTOF, ion source: APCI, measurement mode: positive mode) on peaks independently and analyzing the main peak of the obtained spectrum.

The composition may be a reaction mixture of a multivalent alcohol (B), a diol (D), and a carbonate ester. Since the reaction is generally performed in the presence of a transesterification catalyst, the composition may further contain a transesterification catalyst. Lithium acetylacetonate is preferably used as the transesterification catalyst. The content of the transesterification catalyst based on the total mass of the composition may be 0.0001 to 0.100 mass %.

The state of the composition is not particularly limited, and may be a solid at 25° C. or a liquid at 25° C. The composition may be a liquid at a low temperature (for example, 5° C.). The state of the composition can be changed depending on the type of the contained components (for example, the compounds (A-1) to (A-3) and the multivalent alcohol (B)), the content ratio and the like.

The number average molecular weight of the composition is, for example, 200 to 6,000. Here, the number average molecular weight of the composition is a number average molecular weight in terms of bifunctional polyoxypropylene polyol measured using the entire composition as a measurement target using Gel Permeation Chromatography (GPC).

The hydroxyl value of the composition is, for example, 30 to 800 mg KOH/g. Here, the hydroxyl value of the composition is the number of milligrams (mg) of potassium hydroxide equivalent to hydroxy groups in 1 g of the composition, and is measured according to JIS K1557-1.

Hereinafter, the composition will be described in more detail separately with a plurality of embodiments (the first to third embodiments).

First Embodiment

The composition of the first embodiment contains the compound (A-1) of the first embodiment as the compound (A-1). In the first embodiment, the molar ratio ($C_{A1}/C_B$) is, for example, 0.2 to 150. The composition of the first embodiment having such characteristics is likely to be a solid at 25° C.

In the first embodiment, when $^1$H-NMR measurement of the composition is performed using deuterated chloroform as a solvent and tetramethylsilane as a reference substance, for example, the signal (S1) is observed in a range of 3.430 ppm or more and less than 3.550 ppm in the $^1$H-NMR spectrum, and the signal (S2) is observed in a range of 3.725 ppm or more and 3.800 ppm or less (or 3.725 ppm or more and less than 3.800 ppm) in the $^1$H-NMR spectrum. In addition, when $R^1$ of Formula (I) is an ethyl group, the signal (S3) is observed in a range of 0.700 ppm or more and 1.000 ppm or less, and when $R^1$ of Formula (I) is a methyl group, the signal (S3) is observed in a range of 0.700 ppm or more and 1.130 ppm or less. Therefore, in the first embodiment, the molar ratio ($C_{A1}/C_B$), the molar ratio ($C_{A1}/C_T$) and the molar ratio ($C_B/C_T$) can be determined from the ratio of the integral values of these signals.

The molar ratio ($C_{A1}/C_B$) in the composition of the first embodiment is preferably 0.500 or more, more preferably 3.000 or more, and still more preferably 5.000 or more. The molar ratio ($C_{A1}/C_B$) is preferably 120 or less, more preferably 90 or less, and still more preferably 60 or less. If the molar ratio ($C_{A1}/C_B$) is within the above range, when the composition is used as a raw material for a urethane resin, a urethane resin having a favorable tensile strength, elongation rate and texture and having excellent durability tends to be easily formed.

The molar ratio ($C_{A1}/C_T$) in the composition of the first embodiment is, for example, 0.12 to 0.99. The molar ratio ($C_{A1}/C_T$) may be 0.150 or more or 0.200 or more, and may be 0.800 or less or 0.500 or less. If the molar ratio ($C_{A1}/C_T$) is within the above range, when the composition is used as a raw material for a urethane resin, a urethane resin having a favorable tensile strength, elongation rate and texture and having excellent durability tends to be easily formed.

The molar ratio ($C_B/C_T$) in the composition of the first embodiment is, for example, 0.001 to 0.900. The molar ratio ($C_B/C_T$) may be 0.003 or more or 0.005 or more, and may be 0.300 or less or 0.100 or less. If the molar ratio ($C_B/C_T$) is within the above range, when the composition is used as a raw material for a urethane resin, a urethane resin having a favorable tensile strength, elongation rate and texture and having excellent durability tends to be easily formed.

In the first embodiment, the ratio ($\Delta_{S1}/\Delta_{S2}$) of the integral value $\Delta_{S1}$ of the signal (S1) and the integral value $\Delta_{S2}$ of the signal (S2) is, for example, 0.067 to 50. The ratio ($\Delta_{S1}/\Delta_{S2}$) may be 0.500 or more, 1.000 or more, or 2.000 or more, and may be 40 or less, 30 or less, or 20 or less.

In the first embodiment, the ratio ($\Delta_{S1}/\Delta_{S3}$) of the integral value $\Delta_{S1}$ of the signal (S1) and the integral value $\Delta_{S3}$ of the signal (S3) is, for example, 0.08 to 0.66. The ratio ($\Delta_{S1}/\Delta_{S3}$) may be 0.100 or more or 0.133 or more, and may be 0.533 or less or 0.333 or less.

In the first embodiment, the ratio ($\Delta_{S2}/\Delta_{S3}$) of the integral value $\Delta_{S2}$ of the signal (S2) and the integral value $\Delta_{S3}$ of the signal (S3) is, for example, 0.002 to 1.8. The ratio ($\Delta_{S2}/\Delta_{S3}$) may be 0.006 or more or 0.010 or more, and may be 0.600 or less or 0.200 or less.

Second Embodiment

The composition of the second embodiment contains the compound (A-1) of the second embodiment as the compound (A-1). In the second embodiment, the molar ratio ($C_{A1}/C_B$) is, for example, 0.1 to 150. The composition of the second embodiment having such characteristics is likely to be a liquid at 25° C.

In the second embodiment, when $^1$H-NMR measurement of the composition is performed using deuterated chloroform as a solvent and tetramethylsilane as a reference substance, for example, the signal (S1) is observed in a range of 3.430 ppm or more and 3.530 ppm or less in the $^1$H-NMR spectrum, and the signal (S2) is observed in a range of 3.720 ppm or more and 3.800 ppm or less (or 3.720 ppm or more and less than 3.800 ppm) in the $^1$H-NMR spectrum. In addition, when $R^1$ of Formula (I) is an ethyl group, the signal (S3) is observed in a range of 0.700 ppm or more and 1.000 ppm or less, and when $R^1$ of Formula (I) is a methyl group, the signal (S3) is observed in a range of 0.700 ppm or more and 1.130 ppm or less. Therefore, in the second embodiment, the molar ratio ($C_{A1}/C_B$), the molar ratio ($C_{A1}/C_T$) and the molar ratio ($C_B/C_T$) can be determined from the ratio of the integral values of these signals.

The molar ratio ($C_{A1}/C_B$) in the composition of the second embodiment is preferably 0.100 or more, more preferably 3.000 or more, and still more preferably 5.000 or more. The molar ratio ($C_{A1}/C_B$) is preferably 150 or less, more preferably 90 or less, and still more preferably 60 or less. If the molar ratio ($C_{A1}/C_B$) is within the above range, when the composition is used as a raw material for a urethane resin, a urethane resin having a favorable tensile strength, elongation rate and texture and having excellent durability tends to be easily formed.

The molar ratio ($C_{A1}/C_T$) in the composition of the second embodiment is, for example, 0.10 to 0.99. The molar ratio ($C_{A1}/C_T$) may be 0.200 or more or 0.300 or more, and may be 0.800 or less or 0.600 or less. If the molar ratio ($C_{A1}/C_T$) is within the above range, when the composition is used as a raw material for a urethane resin, a urethane resin having a favorable tensile strength, elongation rate and texture and having excellent durability tends to be easily formed.

The molar ratio ($C_B/C_T$) in the composition of the second embodiment is, for example, 0.001 to 0.900. The molar ratio ($C_B/C_T$) may be 0.005 or more or 0.010 or more, and may be 0.300 or less or 0.100 or less. If the molar ratio ($C_B/C_T$) is within the above range, when the composition is used as a raw material for a urethane resin, a urethane resin having a favorable tensile strength, elongation rate and texture and having excellent durability tends to be easily formed.

In the second embodiment, the ratio ($\Delta_{S1}/\Delta_{S2}$) of the integral value $\Delta_{S1}$ of the signal (S1) and the integral value $\Delta_{S2}$ of the signal (S2) is, for example, 0.030 to 50. The ratio ($\Delta_{S1}/\Delta_{S2}$) may be 0.500 or more, 1.000 or more, or 2.000 or more, and may be 40 or less, 30 or less, or 20 or less.

In the second embodiment, the ratio ($\Delta_{S1}/\Delta_{S3}$) of the integral value $\Delta_{S1}$ of the signal (S1) and the integral value $\Delta_{S3}$ of the signal (S3) is, for example, 0.067 to 0.66. The ratio ($\Delta_{S1}/\Delta_{S3}$) may be 0.133 or more or 0.200 or more, and may be 0.533 or less or 0.400 or less.

In the second embodiment, the ratio ($\Delta_{S2}/\Delta_{S3}$) of the integral value $\Delta_{S2}$ of the signal (S2) and the integral value $\Delta_{S3}$ of the signal (S3) is, for example, 0.002 to 1.800. The ratio ($\Delta_{S2}/\Delta_{S3}$) may be 0.010 or more or 0.020 or more, and may be 0.6 or less or 0.2 or less.

Third Embodiment

The composition of the third embodiment contains the compound (A-1) of the third embodiment as the compound (A-1). In the third embodiment, the molar ratio ($C_{A1}/C_B$) is, for example, 0.1 to 150. The composition of the third embodiment having such characteristics is likely to be a liquid at 25° C.

In the third embodiment, when $^1$H-NMR measurement of the composition is performed using deuterated chloroform as a solvent and tetramethylsilane as a reference substance, for example, the signal (S1) is observed in a range of 3.450 ppm or more and 3.530 ppm or less in the $^1$H-NMR spectrum, and the signal (S2) is observed in a range of 3.720 ppm or more and 3.800 ppm or less (or 3.720 ppm or more and less than 3.800 ppm) in the $^1$H-NMR spectrum. Therefore, in the third embodiment, the molar ratio ($C_{A1}/C_B$) can be determined from the ratio of the integral values of these signals.

The molar ratio ($C_{A1}/C_B$) in the composition of the third embodiment is preferably 0.100 or more, more preferably 1.000 or more, and still more preferably 2.000 or more. The molar ratio ($C_{A1}/C_B$) is preferably 120 or less, more preferably 90 or less, and still more preferably 60 or less. If the molar ratio ($C_{A1}/C_B$) is within the above range, when the composition is used as a raw material for a urethane resin, a urethane resin having an excellent handleability, a favorable elongation rate and texture, and having excellent durability tends to be easily formed.

In the third embodiment, the ratio ($\Delta_{S1}/\Delta_{S2}$) of the integral value $\Delta_{S1}$ of the signal (S1) and the integral value $\Delta_{S2}$ of the signal (S2) is, for example, 0.033 to 50. The ratio ($\Delta_{S1}/\Delta_{S2}$) may be 0.500 or more, 1.000 or more, or 2.000 or more, and may be 40 or less, 30 or less, or 20 or less.

<Method of Producing Polycarbonate Polyol and Composition>

In the method of producing the compound (A-1) of the above embodiment, a mixed solution containing a multivalent alcohol (B), a diol (D), a carbonate ester, and a transesterification catalyst is heated to perform a reflux reaction (transesterification reaction) while removing an alcohol derived from the carbonate ester from a reaction system, and thereby the compound (A-1) is obtained.

In the above method, the composition of the above embodiment can also be obtained as a reaction mixture containing the compound (A-1). Therefore, the above method can be referred to as a method of producing the composition of the above embodiment.

The details of the multivalent alcohol (B), the diol (D) and the carbonate ester are described above, and these suitable examples (examples of preferable $R^1$ and $R^2$, and examples of preferable combinations) are also the same as preferable examples of $R^1$ and $R^2$ of the compound (A-1) and examples of preferable combinations. As the transesterification catalyst, it is preferable to use lithium acetylacetonate so that the desired compound (A-1) can be easily obtained.

If two or more types of diols (D) are used, the ratio of the number of moles of 1,6-hexanediol to the total number of moles of the diols (D) is preferably 0.30 or more (for example, 0.30 to 0.95), more preferably 0.40 or more (for example, 0.40 to 0.95), and still more preferably 0.50 or more (for example, 0.50 to 0.90 or 0.50 to 0.80) so that a urethane resin having favorable tensile strength, elongation rate and texture and excellent durability is easily formed when used as a raw material for a urethane resin.

The mixing ratio of the multivalent alcohol (B) and the diol (D) (the content of the diol (D) in the mixed solution/the content of the multivalent alcohol (B) in the mixed solution) is preferably 1/100 to 5/1 and more preferably 1/80 to 3/1 in terms of the molar ratio. When the mixing ratio of the diol and the multivalent alcohol is set to be within the above range, the compound (A-1) can be efficiently obtained. The mixing ratio may be 1/5 to 60/1 or 1/1 to 40/1 in terms of molar ratio.

The mixing ratio of the carbonate ester, and the multivalent alcohol (B) and the diol (D) (the content of the carbonate ester in the mixed solution/the total content of the contents of the multivalent alcohol (B) and the diol (D) in the mixed solution) is preferably 1/3 to 3/1 and more preferably 1/2.5 to 2.5/1 in terms of the molar ratio. When the mixing ratio of the carbonate ester, and the multivalent alcohol (B) and the diol (D) is set to be within the above range, the compound (A-1) can be efficiently obtained.

The content of the transesterification catalyst in the mixed solution may be 0.0001 to 0.1 parts by mass or 0.0005 to 0.01 parts by mass with respect to a total amount of 100 parts by mass of the multivalent alcohol, the diol, and the carbonate ester in the mixed solution so that it is easy to control the reaction temperature properly and an increase in the number of colors of the reaction product can be suppressed. The content of the transesterification catalyst is preferably as small as possible in view of facilitating control of the reactivity of the urethanization reaction. If the content of the transesterification catalyst is larger, the reactivity of the urethanization reaction is likely to be stronger. The content of the transesterification catalyst in the mixed solution with respect to a total amount of 100 parts by mass of the multivalent alcohol, the diol, and the carbonate ester in the mixed solution is preferably 0.001 parts by mass or more, more preferably 0.002 parts by mass or more, and still more preferably 0.003 parts by mass or more so that it is easy to control the urethanization reaction. The content of the transesterification catalyst in the mixed solution with respect to a total amount of 100 parts by mass of the multivalent alcohol, the diol, and the carbonate ester in the mixed solution is preferably 0.050 parts by mass or less, more preferably 0.040 parts by mass or less, and still more preferably 0.030 parts by mass or less so that an increase in the number of colors of the reaction product can be suppressed. In this regard, the content of the transesterification catalyst in the mixed solution with respect to a total amount of 100 parts by mass of the multivalent alcohol, the diol, and the carbonate ester in the mixed solution is preferably 0.001 to 0.050 parts by mass, more preferably 0.002 to 0.040 parts by mass, and still more preferably 0.003 to 0.030 parts by mass.

The heating temperature (reaction temperature) of the mixed solution is, for example, 80 to 250° C., and may be 100 to 220° C. If the reaction temperature is 80° C. or higher, the transesterification reaction easily proceeds and the desired compound (A-1) can be easily obtained. If the reaction temperature is 250° C. or lower, the number of colors of the obtained compound (A-1) and the composition polyol can be suppressed. In addition, the transesterification reaction may be performed while keeping the temperature constant, or may be performed while raising the temperature stepwise or continuously depending on the progress of the reaction. It is preferable that heating be performed at a temperature T1 that satisfies the relationship of the following Formula (α) and heating be then performed at a temperature T2 that satisfies the relationship of the following Formula (β) so that it is easy to obtain the desired compound (A-1). Here, it is preferable that the temperature T1 and the temperature T2 satisfy the relationship of the following Formula (γ). In addition, it is preferable that the average temperature $T1_m$ of the first heating temperature and the average temperature $T2_m$ of the second heating temperature satisfy the relationship of the following Formula (δ). Here, the progress of the reaction can be estimated from the amount of distillate distilled off.

$$120°\ C.\leq T1 \leq 155°\ C. \tag{α}$$

$$140°\ C.\leq T2 \leq 155°\ C. \tag{β}$$

$$T1 < T2 \tag{γ}$$

$$T1_m < T2_m \tag{δ}$$

The mixed solution can be heated under normal pressure, but in the latter half of the reaction, heating can be performed under a reduced pressure (for example, under a pressure of 101 to 0.1 kPa). Therefore, it is possible to increase the distillation rate of the generated distillate and accelerate the progress of the reaction. Here, in this specification, the normal pressure is a pressure of 101.325 kPa±20.000 kPa. In view of obtaining the desired compound (A-1) easily, preferably, heating of the mixed solution includes heating under a pressure of 101.325 kPa±20.000 kPa (first heating), and heating subsequently under a reduced pressure of 10.000 kPa or less (second heating), more preferably, the first heating temperature is the temperature T1 that satisfies the relationship of Formula (α), and the second heating temperature is the temperature T2 that satisfies the relationship of Formula (β), and still more preferably, the first heating temperature (temperature T1) and the second heating temperature (temperature T2) satisfy the relationship of Formula (γ). In view of obtaining the compound (A-1) more easily, it is preferable to distill off the alcohol derived from the carbonate ester at 120° C. or lower and remove it from the reaction system.

In the production method, the obtained reaction mixture may be subjected to post treatments such as distillation and drying. In addition, in the production method, after the compound (A-1) or a composition containing the same is obtained, a component such as a multivalent alcohol (B) may be added to prepare the composition of the above embodiment (for example, the composition that satisfies the above molar ratio ($C_{A1}/C_B$), molar ratio ($C_{A1}/C_T$) and molar ratio ($C_B/C_T$)).

<Urethane Resin and Method of Producing the Same>

The urethane resin is a polycondensate of a polyol component and a polyisocyanate component or a crosslinked product thereof. Here, the crosslinked product is a product in which polycondensates are crosslinked with each other by a chain extender or the like.

(Polyol Component)

The polyol component contains the compound (A-1). The polyol component may contain a polyol (compound having two or more terminalhydroxy groups) other than the compound (A-1). The polyol component may further include, for example, polyols (the compound (A-2), the compound (A-3), the multivalent alcohol (B), the diol (D), the polycarbonate diol, and the like) that can be included in the composition. The content ratios of these polyols may be the same as the content ratios of the polyols in the composition (for example, the molar ratio $(C_{A1}/C_B)$, the molar ratio $(C_{A1}/C_T)$ and the molar ratio $(C_B/C_T)$). In other words, the polyol component may contain a polyol mixture obtained by removing compounds other than the polyol from the composition.

The polyol component may further contain a polyol having an acid group. In this case, the urethane resin contains an acid group. A urethane resin having an acid group is suitably used for an aqueous urethane resin dispersion. The aqueous urethane resin dispersion will be described below.

The acid group is, for example, a functional group (hydrophilic group) that can impart hydrophilicity to the isocyanate group-terminated prepolymer obtained by reaction with isocyanate. Examples of polyols having such an acid group include dimethylol alkanoic acids such as dimethylolpropionic acid (DMPA), dimethylolbutanoic acid (DMBA), dimethylolpentanoic acid, and dimethylolnonanoic acid.

(Polyisocyanate)

Examples of polyisocyanates include aromatic polyisocyanates, aromatic aliphatic polyisocyanates, aliphatic polyisocyanates and alicyclic polyisocyanates. In addition, modified polyisocyanates which are modified product thereof can be used. Examples of modified polyisocyanates include isocyanurate-modified polyisocyanates (trimer of isocyanate), allophanate-modified polyisocyanates, uretdione-modified polyisocyanate, urethane-modified polyisocyanates, biuret-modified polyisocyanates, utretonimine-modified polyisocyanates, and acylurea-modified polyisocyanate. These may be used alone and two or more thereof may be used in combination.

Examples of aromatic isocyanates include 2,4-tolylene diisocyanate, 2,6-tolylene diisocyanate, a 2,4-tolylene diisocyanate/2,6-tolylene diisocyanate mixture, 4,4'-diphenylmethane diisocyanate, 2,4'-diphenylmethane diisocyanate, a 2,4'-diphenylmethane diisocyanate/4,4'-diphenylmethane diisocyanate mixture, m-xylylene diisocyanate, p-xylylene diisocyanate, 4,4'-diphenylether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, and 3,3'-dimethoxydiphenyl-4,4'-diisocyanate.

Examples of aromatic aliphatic isocyanates include 1,3-xylylene diisocyanate, 1,4-xylylene diisocyanate, and a mixture thereof; 1,3-bis(1-isocyanato-1-methylethyl)benzene, 1,4-bis(1-isocyanato-1-methylethyl)benzene, and a mixture thereof; and ω,ω'-diisocyanato-1,4-diethylbenzene.

Examples of aliphatic isocyanates include hexamethylene diisocyanate, tetramethylene diisocyanate, 2-methylpentane-1,5-diisocyanate, 3-methylpentane-1,5-diisocyanate, lysine diisocyanate, trioxyethylene diisocyanate, ethylene diisocyanate, trimethylene diisocyanate, octamethylene diisocyanate, nonamethylene diisocyanate, 2,2'-dimethylpentane diisocyanate, 2,2,4-trimethylhexane diisocyanate, decamethylene diisocyanate, butene diisocyanate, 1,3-butadiene-1,4-diisocyanate, 2,4,4-trimethylhexamethylene diisocyanate, 1,6,11-undecanetriisocyanate, 1,3,6-hexamethylene triisocyanate, 1,8-diisocyanato-4-(isocyanatomethyl)octane, 2,5,7-trimethyl-1,8-diisocyanato-5-(isocyanatomethyl)octane, bis(isocyanatoethyl)carbonate, bis(isocyanatoethyl)ether, 1,4-butylene glycol dipropyl ether-α,α'-diisocyanate, lysine diisocyanatomethyl ester, 2-isocyanatoethyl-2,6-diisocyanatohexanoate, and 2-isocyanatopropyl-2,6-diisocyanatohexanoate.

Examples of alicyclic isocyanates include isophorone diisocyanate, cyclohexyl diisocyanate, bis(isocyanatomethyl)cyclohexane, dicyclohexylmethane diisocyanate, methylcyclohexyl diisocyanate, dicyclohexyldimethylmethane diisocyanate, 2,2'-dimethyldicyclohexylmethane diisocyanate, bis(4-isocyanato-n-butylidene)pentaerythritol, hydrogenated dimer acid diisocyanate, 2-isocyanatomethyl-3-(3-isocyanatopropyl)-5-(isocyanatomethyl)bicyclo[2.2.1]heptane, 2-(isocyanatomethyl)3-(3-isocyanatopropyl)-6-(isocyanatomethyl)-bicyclo[2.2.1]heptane, 2-(isocyanatomethyl)-2-(3-isocyanatopropyl)-5-(isocyanatomethyl)bicyclo[2.2.1]heptane, 2-(isocyanatomethyl)-2-(3-isocyanatopropyl)-6-(isocyanatomethyl)bicyclo[2.2.1]heptane, 2-(isocyanatomethyl)-3-(3-isocyanatopropyl)-5-(2-isocyanatoethyl)bicyclo[2.2.1]heptane, 2-(isocyanatomethyl)-3-(3-isocyanatopropyl)-6-(2-isocyanatoethyl)bicyclo[2.2.1]heptane, 2-(isocyanatomethyl)-2-(3-isocyanatopropyl)-5-(2-isocyanatoethyl)bicyclo[2.2.1]heptane, 2-(isocyanatomethyl)-2-(3-isocyanatopropyl)-6-(2-isocyanatoethyl)bicyclo[2.2.1]heptane, 2,5-bis(isocyanatomethyl)bicyclo[2.2.1]heptane, hydrogenated diphenylmethane diisocyanate, norbornane diisocyanate, hydrogenated tolylene diisocyanate, hydrogenated xylene diisocyanate, and hydrogenated tetramethylxylene diisocyanate.

(Blending Ratio of Polyol Component/Polyisocyanate Component)

For the blending ratio of the polyol component and the polyisocyanate component, the molar ratio of active hydrogen in the polyol component and the isocyanate group in the polyisocyanate component is preferably 9:1 to 1:9, and more preferably 6:4 to 4:6. If the blending ratio is within the above range, the urethane resin tends to have better performance.

(Chain Extender)

The chain extender can be appropriately selected according to the purpose, application, and the like. As the chain extenders, water; low-molecular-weight polyols such as ethylene glycol, 1,3-propanediol, 1,4-butanediol, 1,5-pentanediol, 1,6-hexanediol, neopentyl glycol, 1,10-decanediol, 1,1-cyclohexanedimethanol, 1,4-cyclohexanedimethanol, tricyclodecandimethanol, xylylene glycol, bis(p-hydroxy)diphenyl, bis(p-hydroxyphenyl)propane, 2,2-bis[4-(2-hydroxyethoxy)phenyl]propane, bis[4-(2-hydroxyethoxy)phenyl]sulfone, and 1,1-bis[4-(2-hydroxyethoxy)phenyl]cyclohexane; high-molecular-weight polyols such as polyester polyol, polyester amide polyol, polyether polyol, polyether ester polyol, polycarbonate polyol, and polyolefin polyol; polyamines such as ethylenediamine, isophorone diamine, 2-methyl-1,5-pentanediamine, aminoethylethanolamine, diethylenetriamine, triethylenetetramine, tetraethylenepentamine, and pentaethylenehexamine, and the like can be used. The amount of the chain extender added (the proportion of the structure derived from the chain extender contained in the urethane resin) with respect to a total amount of 100 parts by mass of the polyol component and the polyisocyanate component may be 0.1 to 50 parts by mass. Here, when the chain extender is a polyol, the content of the polyol is calculated as the content of the polyols contained in both the chain extender and the polyol component.

The urethane resin can be obtained by reacting (urethanization reaction) a polyol component and a polyisocyanate component, and in some cases, a chain extender. The urethanization reaction may be performed at room temperature (for example, 25° C.), or performed under heating (for example, 40 to 150° C.).

During the urethanization reaction, a catalyst (urethanization catalyst) can be added in order to shorten the reaction time, improve the reaction rate, and the like. Examples of catalysts include tertiary amine catalysts such as triethylamine, triethylenediamine, tetramethylethylenediamine, tetramethylpropylenediamine, and tetramethylhexamethylenediamine, and metal catalysts represented by tin-based catalysts such as stannous octoate, stannous olate, and dibutyl tin dilaurate. These may be used alone and two or more thereof may be used in combination. Among these dibutyl tin dilaurate is preferably used. The amount of the catalyst used with respect to a total amount of 100 parts by mass of the polyol component and the polyisocyanate component may be 0.001 to 100 parts by mass.

When a catalyst is used during the urethanization reaction, it is preferable to use a phosphorus compound for treating the catalyst. The phosphorus compound is not particularly limited, and examples thereof include phosphate triesters such as trimethyl phosphate, triethyl phosphate, tributyl phosphate, di-2-ethylhexyl phosphate, triphenylphosphate, tricresyl phosphate, and cresyldiphenyl phosphate; acidic phosphate esters such as methyl acid phosphate, ethyl acid phosphate, propyl acid phosphate, isopropyl acid phosphate, butyl acid phosphate, lauryl acid phosphate, stearyl acid phosphate, 2-ethylhexyl acid phosphate, isodecyl acid phosphate, butoxyethyl acid phosphate, oleyl acid phosphate, tetracocil acid phosphate, athylene glycol acid phosphate, 2-hydroxyethyl methacrylate acid phosphate, dibutyl phosphate, monobutyl phosphate, monoisodecyl phosphate, and bis(2-ethylhexyl)phosphate; phosphite esters such as triphenylphosphite, trisnonylphenylphosphite, tricresylphosphite, triethylphosphite, tris(2-ethylhexyl)phosphite, tridecylphosphite, trilaurylphosphite, tris(tridecylic)phosphite, triolein phosphite, diphenylmono(2-ethylhexyl)phosphite, diphenyl monodecyl phosphite, diphenyl(monodecyl)phosphite, trilauryl phosphite, diethylhydrogen phosphite, bis(2-ethylhexyl)hydrogen phosphite, dilauryl hydrogen phosphite, dioleyl hydrogen phosphite, diphenyl hydrogen phosphite, tetraphenyl dipropyleneglycol diphosphite, bis(decyl)pentaerythritol diphosphite, tristearyl phosphite, distearyl pentaerythritol diphosphite, and tris(2,4-di-tert-butylphenyl)phosphite; phosphoric acid, phosphorous acid, and hypophosphorous acid. These may be used alone and two or more thereof may be used in combination. Among these, acidic phosphate ester is preferable, and 2-ethylhexyl acid phosphate is more preferable. The amount of a phosphorus compound used may be 10 to 2,000 parts by mass with respect to 100 parts by mass of the catalyst.

The urethanization reaction can be performed in the presence of a solvent. As the solvent, esters such as ethyl acetate, butyl acetate, propyl acetate, γ-butyrolactone, δ-valerolactone, and ε-caprolactone; amides such as dimethylformamide, diethyl formamide, and dimethylacetamide; sulfoxides such as dimethyl sulfoxide; ethers such as tetrahydrofuran, dioxane, and 2-ethoxyethanol; ketones such as methyl ethyl ketone, methyl isobutyl ketone, and cyclohexanone; aromatic hydrocarbons such as benzene and toluene and the like can be used.

The urethane resin described above has a favorable elongation rate and texture and excellent durability, and also in some cases, has a favorable tensile strength. Therefore, the urethane resin can be suitably used for synthetic leather, artificial leather, coating materials and the like.

<Aqueous Urethane Resin Dispersion>

The aqueous urethane resin dispersion contains an aqueous medium, and a urethane resin dispersed in the aqueous medium or a neutralized product thereof. The urethane resin is a resin having an acid group (a polyol component contains a polyol having an acid group) among the above urethane resins.

As the aqueous medium, a solution containing an emulsifying agent, a dispersing agent and the like in addition to water can be used. The aqueous medium preferably contains water, and more preferably contains only water.

When the aqueous urethane resin dispersion contains a neutralized product of the urethane resin, the acid group of the urethane resin may be neutralized with a neutralizer. Examples of neutralizers include organic amines such as ammonia, ethylamine, trimethylamine, triethylamine, triisopropylamine, tributylamine, triethanolamine, N-methyldiethanolamine, N-phenyldiethanolamine, monoethanolamine, dimethylethanolamine, diethylethanolamine, morpholine, N-methylmorpholine, 2-amino-2-ethyl-1-propanol, and higher alkyl-modified morpholine, alkali metals such as lithium, potassium, and sodium, and inorganic alkalis such as sodium hydroxide and potassium hydroxide. In view of improving the durability and smoothness of the coating film and the like, a highly volatile neutralizer that easily dissociates with heating such as ammonia, trimethylamine or triethylamine is preferably used. These neutralizers may be used alone or two or more thereof may be used in combination.

When an aqueous urethane resin dispersion is produced, an anionic polar group-containing compound can also be used. Examples of anionic polar group-containing compounds include a compound composed of an organic acid having one or more active hydrogen atoms and a neutralizer. Examples of organic acids include carboxylate, sulfonate, phosphate, phosphonate, phosphinate, and thiosulfonate. These anionic polar groups contained in the organic acid may be introduced alone or may be associated with metal ions such as a chelate.

When an aqueous urethane resin dispersion is produced, a cationic polar group-containing compound can also be used. Regarding the cationic polar group-containing compound, for example, one selected from the group consisting of tertiary amines having one or more active hydrogen atoms, inorganic acid neutralizers, organic acid neutralizers and quaternary agents. In addition, regarding the cationic polar group-containing compound, cationic compounds such as primary amine salts, secondary amine salts, tertiary amine salts, and pyridinium salts can also be used.

Examples of tertiary amines having one or more active hydrogen atoms include N,N-dimethylethanolamine, N,N-diethylethanolamine, N,N-dipropylethanolamine, N,N-diphenylethanolamine, N-methyl-N-ethylethanolamine, N-methyl-N-phenylethanolamine, N,N-dimethylpropanolamine, N-methyl-N-ethylpropanolamine, N-methyldiethanolamine, N-ethyldiethanolamine, N-methyldipropanolamine, N-phenyldiethanolamine, N-phenyldipropanolamine, N-hydroxyethyl-N-hydroxypropyl-methylamine, N,N'-dihydroxyethylpiperazine, triethanolamine, trisisopropanolamine, N-methyl-bis-(3-aminopropyl)-amine, and N-methyl-bis-(2-aminopropyl)-amine. In addition, those obtained by adding an alkylene oxide to primary amines such as ammonia and methylamine or secondary amines such as dimethylamine can also be used.

Examples of inorganic acids and organic acids include hydrochloric acid, acetic acid, lactic acid, cyanoacetic acid, phosphoric acid and sulfuric acid.

Examples of quaternary agents include dimethyl sulfate, benzyl chloride, bromoacetamide, and chloroacetamide. In addition, alkyl halides such as ethyl bromide, propyl bromide, and butyl bromide can also be used.

The aqueous urethane resin dispersion can be produced by sequentially performing, for example, a process in which a polyol component containing a polyol having an acid group and a polyisocyanate component are reacted in the presence of a solvent or in the absence of a solvent to obtain a urethane prepolymer, a process in which an acid group in the prepolymer is neutralized with a neutralizer, a process in which the neutralized prepolymer is dispersed in an aqueous medium, and a process in which the prepolymer dispersed in the aqueous medium is reacted with a chain extender. Here, in each process, as necessary, a catalyst can be used to accelerate the reaction, and the amount of by-products can be controlled.

The film formed from the aqueous urethane resin dispersion described above (for example, the film formed by applying the aqueous urethane resin dispersion to a substrate) has excellent adhesion, flexibility, tactile sensation, and the like. Therefore, the aqueous urethane resin dispersion can be suitably used for artificial leather, synthetic leather and coating materials.

<Two-component composition set>

The polyol component and the polyisocyanate component for forming the urethane resin may be stored or transported in another container as a two-component composition set. The two-component composition set contains a first liquid containing at least the polyol component and a second liquid containing at least the polyisocyanate component. When a chain extender, a catalyst, a solvent and the like are used, these may be included in the first liquid and/or the second liquid, and may be added separately from the first liquid and the second liquid. The two-component composition set can be suitably used, for example, as a coating material, and can also be suitably used when artificial leather, synthetic leather or the like are produced. When the two-component composition set is used as a coating material, for example, after the first liquid and the second liquid are mixed, the obtained mixed solution is applied to a substrate, and in some cases, heating is performed, and thus a coating film (for example, a cured film containing a urethane resin) can be formed.

EXAMPLES

Hereinafter, examples of the present invention will be described, but the present invention is not limited to these examples.

First Example

Example 1A 35.2 g of trimethylolpropane, 354.2 g of 1,4-butanediol, 510.7 g of diethyl carbonate, and 0.045 g of lithium acetylacetonate were mixed in a 1 L 2-neck glass reactor including a stirrer, a thermometer, a heating device and a cooler. The obtained mixed solution was heated at 130 to 150° C. (initial 130° C., final stage 150° C.) under normal pressure, and reacted for 8 hours while removing low-boiling-point components (an alcohol derived from the carbonate ester and the like). The distillate temperature was 77° C. or higher and less than 79° C. In addition, the pressure in the flask was reduced to 1 kPa at a reaction temperature of 150° C., the reaction was additionally performed for 8 hours, and thus a composition (PCP-1A) containing a polycarbonate polyol represented by Formula (A-1) was obtained.

Example 2A

A composition (PCP-2A) containing a polycarbonate polyol represented by Formula (A-1) was obtained in the same manner as in Example 1A except that a mixed solution obtained by mixing 31.3 g of trimethylolpropane, 413.8 g of 1,6-hexanediol, 454.9 g of diethyl carbonate, and 0.045 g of lithium acetylacetonate was used.

Example 3A

A composition (PCP-3A) containing a polycarbonate polyol represented by Formula (A-1) was obtained in the same manner as in Example 1A except that a mixed solution obtained by mixing 83.0 g of trimethylolpropane, 334.6 g of 1,4-butanediol, 482.4 g of diethyl carbonate, and 0.045 g of lithium acetylacetonate was used.

Example 4A

A composition (PCP-4A) containing a polycarbonate polyol represented by Formula (A-1) was obtained in the same manner as in Example 1A except that a mixed solution obtained by mixing 74.4 g of trimethylolpropane, 393.2 g of 1,6-hexanediol, 432.4 g of diethyl carbonate and 0.045 g of lithium acetylacetonate in a 1 L 2-neck glass reactor including a stirrer, a thermometer, a heating device and a cooler was used.

Example 5A

A composition (PCP-5A) containing a polycarbonate polyol represented by Formula (A-1) was obtained by mixing 900 g of the composition (PCP-2A) obtained in Example 2A and 100 g of trimethylolpropane at 80° C.

Example 6A

A composition (PCP-6A) containing a polycarbonate polyol represented by Formula (A-1) was obtained in the same manner as in Example 1A except that a mixed solution obtained by mixing 33.6 g of trimethylolethane, 198.3 g of 1,6-hexanediol, 218.1 g of diethyl carbonate and 0.025 g of lithium acetylacetonate in a 1 L 2-neck glass reactor including a stirrer, a thermometer, a heating device and a cooler was used.

Example 7A

A composition (PCP-7A) containing a polycarbonate polyol represented by Formula (A-1) was obtained in the same manner as in Example 1A except that a mixed solution obtained by mixing 37.7 g of pentaerythritol, 196.4 g of 1,6-hexanediol, 215.9 g of diethyl carbonate, and 0.025 g of lithium acetylacetonate in a 1 L 2-neck glass reactor including a stirrer, a thermometer, a heating device and a cooler was used.

Example 8A

A composition (PCP-8A) containing a polycarbonate polyol represented by Formula (A-1) was obtained in the same manner as in Example 4A except that the distillate temperature was 80° C. or higher and lower than 83° C.

Example 9A

A composition (PCP-9A) containing a polycarbonate polyol represented by Formula (A-1) was obtained in the same manner as in Example 4A except that the amount of lithium acetylacetonate added was changed to 0.135 g, and the distillate temperature was set to 84° C. or higher and lower than 108° C.

Reference Example 1A

A composition (PCP-10A) containing a polycarbonate polyol represented by Formula (A-1) was obtained by mixing 800 g of the composition (PCP-2A) obtained in Example 2A and 200 g of trimethylolpropane at 80° C.

Reference Example 2A

The mixed solution obtained in the same manner as in Example 4A was heated at 150° C. (initial 150° C., final stage 150° C.) under normal pressure, and reacted for 8 hours while removing low-boiling-point components (an alcohol derived from the carbonate ester and the like). The distillate temperature was set to be higher than 120° C. In addition, the pressure in the flask was reduced to 1 kPa at a reaction temperature of 150° C., the reaction was additionally performed for 8 hours, and thus a composition (PCP-11A) containing a polycarbonate polyol represented by Formula (A-1) was obtained.

Reference Example 3A

A composition (PCP-12A) containing a polycarbonate polyol represented by Formula (A-1) was obtained in the same manner as in Reference Example 2A except that the pressure in the flask was sharply reduced to 1 kPa at a reaction temperature of 150° C.

Reference Example 4A

A composition (PCP-13A) containing a polycarbonate polyol represented by Formula (A-1) was obtained in the same manner as in Reference Example 2A except that the heating temperature under normal pressure was set to 140 to 150° C. (initial 140° C., final stage 150° C.).

Comparative Example 1A

A composition (PCD-1A) containing a polycarbonate diol was obtained by mixing 450 g of NIPPOLLAN 980R and 450 g of trimethylolpropane at 80° C.

Comparative Example 2A

A composition (PCP-14A) containing a polycarbonate polyol was obtained in the same manner as in Example 1A except that a mixed solution obtained by mixing 74.4 g of trimethylolpropane, 393.2 g of 1,6-hexanediol, 432.4 g of diethyl carbonate, and 0.09 g of tetrabutyl titanate.

(Analysis and Evaluation)

[Measurement of number average molecular weight] The compositions obtained above were subjected to GPC analysis under the following conditions, and the number average molecular weight of the composition was measured. The results are shown in Table 2 and Table 3.

—Conditions—
(1) Measuring instrument: HLC-8420 (commercially available from Tosoh Corporation)
(2) Column: TSKgel (commercially available from Tosoh Corporation)
G3000H-XL
G3000H-XL
G2000H-XL
G2000H-XL
(3) Mobile phase: THF (tetrahydrofuran)
(4) Detector: refractive index (RI) detector (HLC-8420 accessory)
(5) Temperature: 40° C.
(6) Flow rate: 1.000 ml/min
(7) Calibration curve: a calibration curve was obtained using the following products (all are bifunctional polyoxypropylene polyols commercially available from Sanyo Chemical Industries, Ltd.).
"SANNIX PP-200" (number average molecular weight=200, average number of functional groups: 2)
"SANNIX PP-400" (number average molecular weight=400, average number of functional groups: 2)
"SANNIX PP-1000" (number average molecular weight=1,000, average number of functional groups: 2) "SANNIX PP-2000" (number average molecular weight=2,000, average number of functional groups: 2)
"SANNIX PP-3000" (number average molecular weight=3,200, average number of functional groups: 2)
"SANNIX PP-4000" (number average molecular weight=4,160, average number of functional groups: 2)
(8) Approximate formula of calibration curve: cubic formula
(9) Sample solution concentration: 0.5 mass % THF solution

[Measurement of Hydroxyl Value]
The hydroxyl value of the compositions obtained above was measured by a method using an acetylation reagent according to JIS K1557-1. The results are shown in Table 2 and Table 3.

[State Evaluation]
The composition obtained above was used as a sample, and the sample was heated at 80° C. for 1 hour and then left at 5° C. and 25° C. for 3 days. The state of the sample after being left was visually checked, and if there was even slight fluidity at the above temperature, the state was a liquid, and if there was no fluidity, the state was a solid. The results are shown in Table 2 and Table 3.

[Composition Analysis (1)]
The composition was subjected to composition analysis under the following procedure.

Figure 2:
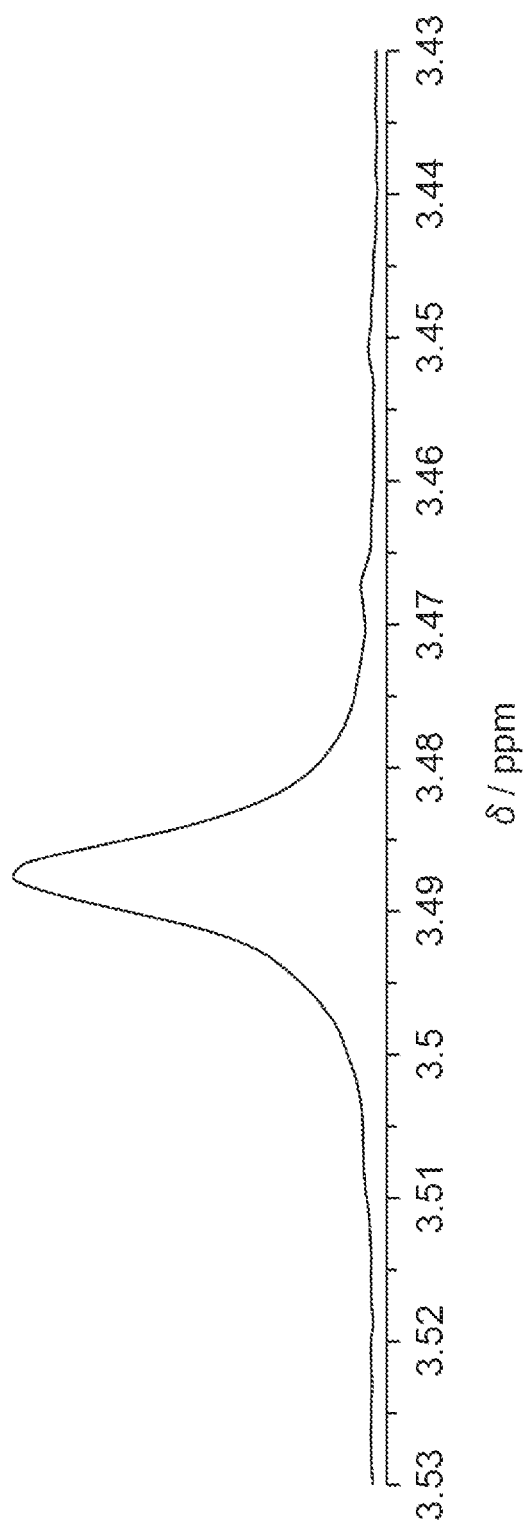
FIG. 2 is a diagram of the $^1$H-NMR spectrum of the composition containing the polycarbonate polyol obtained in Example 2A, which is enlarged in a range of 3.430 ppm or more and less than 3.550 ppm.
Figure 3:
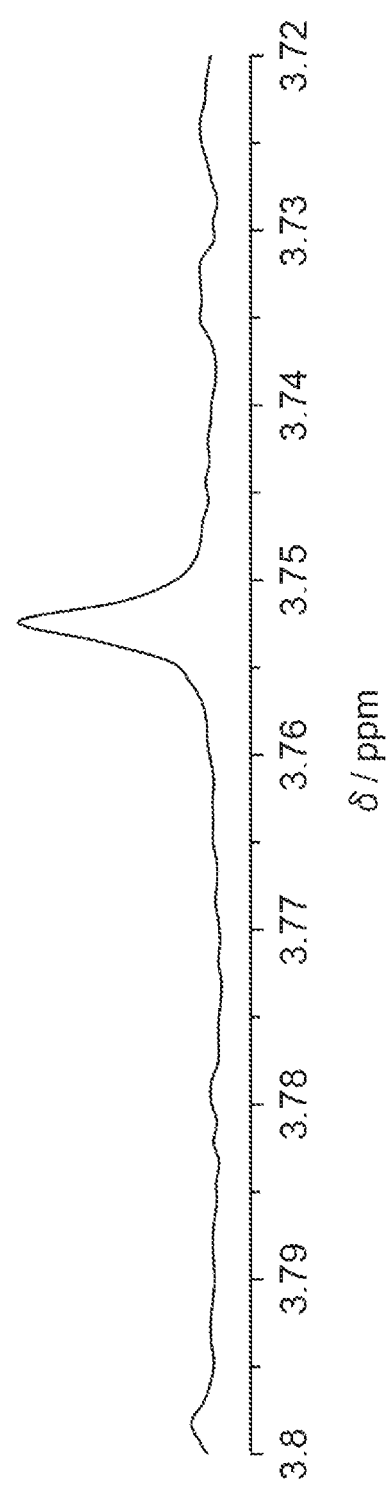
FIG. 3 is a diagram of the $^1$H-NMR spectrum of the composition containing the polycarbonate polyol obtained in Example 2A, which is enlarged in a range of 3.725 ppm or more and 3.800 ppm or less.

First, the composition (sample) obtained above was dissolved in deuterated chloroform (commercially available from FUJIFILM Wako Pure Chemical Corporation) to obtain a solution. Tetramethylsilane (TMS) was added to the solution as a chemical shift reference to obtain a test solution. For the obtained test solution, $^1$H-NMR was measured using JNM-ECX400 (commercially available from JEOL Ltd.), and a $^1$H-NMR spectrum was obtained using a TMS signal at 0 ppm. For reference, FIG. 1 to FIG. 3 show the $^1$-NMR spectrum of the composition obtained in Example 2A. Here, the measurement was performed under the following conditions.

—Conditions—

Resonance frequency: 400 MHz

Pulse width: 45 degree

Waiting time: 5 seconds

Cumulative number: 64

Sample solution concentration (TMS-containing deuterated chloroform):3 mass vol %

Next, from the $^1$H-NMR spectrum obtained above, the integral value $\Delta_{S1}$ of the signal (S1) of methylene positioned next to the hydroxy group of the group represented by Formula (a-1) and the integral value $\Delta_{S2}$ of the signal (S2) methylene positioned next to the hydroxy group of the multivalent alcohol (B) were obtained. In addition, when $R^1$ of the group represented by Formula (I) was a methyl group or an ethyl group, the integral value of the signals of these terminal methyl groups was obtained, and this was set as the integral value $\Delta_{S3}$ of the signal (S3). Specifically, the signal in a range of 3.430 ppm or more and less than 3.550 ppm was set as the signal (S1), the signal in a range of 3.725 ppm or more and 3.800 ppm or less was set as the signal (S2), the signal in a range of 0.700 ppm or more and 1.130 ppm or less was set as the signal (S3) when $R^1$ of the group represented by Formula (I) was a methyl group (when the multivalent alcohol (B) was trimethylolethane), and the signal in a range of 0.700 ppm or more and 1.000 ppm or less was set as the signal (S3) when IV of the group represented by Formula (I) was an ethyl group (when the multivalent alcohol (B) was trimethylolpropane). Here, the baseline for integral value measurement was a straight line drawn horizontally with the lower spectrum intensity as a reference by comparing the spectrum intensities at both ends of a specified spectrum range.

From the obtained integral values, the molar ratio ($C_{A1}/C_B$), the molar ratio ($C_{A1}/C_T$) and the molar ratio ($C_B/C_T$) were calculated. The results are shown in Table 2 and Table 3. Here, in PCP-1A to 13A, the presence of the compound (A-1) was suggested according to the presence of the signal (S1). On the other hand, in PCD-1A and PCP-14A, no signal (S1) was confirmed. In addition, in PCP-1A to 13A, the presence of the compound (A-2) was suggested according to the presence of the signal (S4) in a range of 3.550 ppm or more and 3.62 ppm or less. Here, when the total number of moles of the group in which one of three bonds in Formula (I) was a bond to a carbonate group, and two thereof were bonds to a hydroxy group is set as $C_{A2}$, the integral value of the signal (S4) correlated with $C_{A2}$. In addition, when the total number of moles of the group in which all three bonds in Formula (I) were bonds to a carbonate group was set as Cm, $C_T$ corresponded to the sum of $C_{A1}$, $C_{A2}$, $C_{A3}$ and $C_B$. In PCP-1A to 6A and PCP-8A to 14A, it was confirmed that the values obtained by subtracting $C_{A1}$, $C_{A2}$ and $C_B$ from $C_T$ ware positive according to the integral value of the signals (S1) to (S4), and thus the presence of the compound (A-3) was suggested.

[Composition Analysis (2)]

Under the following conditions, LC-MS measurement of the composition obtained above was performed, the maximum intensity P3 of the peak corresponding to the polycarbonate diol in which q in Formula (E) was 3, the maximum intensity P4 of the peak corresponding to the polycarbonate diol in which q in Formula (E) was 4, and the maximum intensity P5 of the peak corresponding to the polycarbonate diol in which q in Formula (E) was 5 were obtained, and the ratio of P3 to the sum of P3, P4 and P5 (P3/[P3+P4+P5]) and the ratio of P5 to the sum of P3, P4 and P5 (P5/[P3+P4+P5]) were obtained. The results are shown in Table 2 and Table 3.

—Conditions—

(1) Measuring instrument: Agilent 1290 Infinity II Series (commercially available from Agilemt Technologies)

(2) Column: TSKgel (commercially available from Tosoh Corporation) TSKgel ODS-100 V (4.6 mmIDx15 cm)

(3) Mobile phase:

A liquid: water/methanol=5/5 (vol/vol %)

B liquid: tetrahydrofuran (THF)

Water: purified water

THF: for HPLC commercially available from FUJIFILM Wako Pure Chemical Corporation Methanol: for HPLC commercially available from FUJIFILM Wako Pure Chemical Corporation (4) Pretreatment A specimen (composition) was weighed out, a predetermined mobile phase (B liquid) was added thereto, and the mixture was left overnight at room temperature and dissolved. The obtained specimen solution was gently shaken and filtered through a 0.45 μm PTFE cartridge filter.

(5) Gradient condition

TABLE 1

| Time (min.) | A liquid (v/v %) | B liquid (v/v %) |
| --- | --- | --- |
| 0 | 90 | 10 |
| 5 | 90 | 10 |
| 10 | 60 | 40 |
| 55 | 0 | 100 |
| 62 | 0 | 100 |
| 62.1 | 90 | 10 |

(6) Detector: Evaporative light-scattering detector (ELSD) G4260B (commercially available from Agilemt Technologies)

(7) Temperature: 40° C.

(8) Flow rate: 0.40 ml/min (9) Injection amount: 15 μL

(10) Sample solution concentration (THF): 1.0 mg/L

Here, the molecular structure of each peak was identified by performing MS measurement (device: Bruker Daltonics microTOF, ion source: APCI, measurement mode: positive mode) of each peak alone.

TABLE 2

| | | | Example 1A | Example 2A | Example 3A | Example 4A | Example 5A | Example 6A | Example 7A | Example 8A | Example 9A |
|---|---|---|---|---|---|---|---|---|---|---|---|
| Composition | Composition | | PCP-1A | PCP-2A | PCP-3A | PCP-4A | PCP-5A | PCP-6A | PCP-7A | PCP-8A | PCP-9A |
| | Diol (D) | 1,4-butanediol | 354.2 | — | 334.6 | — | — | — | — | — | — |
| | | 1,6-hexanediol | — | 413.8 | — | 393.2 | — | 198.3 | 196.4 | 393.2 | 393.2 |
| | Multivalent alcohol (B) | Trimethylolpropane | 35.2 | 31.3 | 83.0 | 74.4 | 100.0 | — | — | 74.4 | 74.4 |
| | | Trimethylolethane | — | — | — | — | — | 33.6 | — | — | — |
| | | Pentaerythritol | — | — | — | — | — | — | 37.7 | — | — |
| | Carbonate ester | Diethyl carbonate | 510.7 | 454.9 | 482.4 | 432.4 | — | 218.1 | 215.9 | 432.4 | 432.4 |
| | Catalyst | Lithium acetylacetonate | 0.045 | 0.045 | 0.045 | 0.045 | — | 0.025 | 0.025 | 0.045 | 0.135 |
| | Composition | PCP-2A | — | — | — | — | 900.0 | — | — | — | — |
| Analysis and evaluation | Number average molecular weight (g/mol) | | 1390 | 1820 | 650 | 1060 | 640 | 1150 | 980 | 706 | 415 |
| | Hydroxyl value (mg KOH/g) | | 94 | 79 | 225 | 163 | 189 | 150 | 220 | 233 | 408 |
| | State | 5° C. | Solid | Solid | Solid | Solid | Solid | Solid | Solid | Solid | Liquid |
| | | 25° C. | Solid | Solid | Solid | Solid | Solid | Solid | Solid | Solid | Liquid |
| | Composition analysis (1) $^1$H-NMR measurement | $C_{A1}/C_B$ | 35.000 | 40.200 | 9.429 | 9.577 | 0.206 | 13.050 | 1.420 | 3.833 | 0.755 |
| | | $C_{A1}/C_T$ | 0.350 | 0.335 | 0.440 | 0.415 | 0.135 | 0.435 | — | 0.345 | 0.190 |
| | | $C_B/C_T$ | 0.010 | 0.008 | 0.047 | 0.043 | 0.657 | 0.033 | — | 0.090 | 0.252 |
| | Composition analysis (2) LC-MS measurement | P3/[P3 + P4 + P5] | — | 0.25 | — | 0.35 | — | — | — | 0.40 | 0.50 |
| | | P5/[P3 + P4 + P5] | — | 0.37 | — | 0.26 | — | — | — | 0.22 | 0.14 |

TABLE 3

| | | | Reference Example 1A | Reference Example 2A | Reference Example 3A | Reference Example 4A | Comparative Example 1A | Comparative Example 2A |
|---|---|---|---|---|---|---|---|---|
| Composition | Composition | | PCP-10A | PCP-11A | PCP-12A | PCP-13A | PCD-1A | PCD-14A |
| | Diol (D) | 1,6-hexanediol | — | 393.2 | 393.2 | 393.2 | — | 393.2 |
| | Multivalent alcohol (B) | Trimethylolpropane | 200.0 | 74.4 | 74.4 | 74.4 | 450.0 | 74.4 |
| | Carbonate ester | Diethyl carbonate | — | 432.4 | 432.4 | 432.4 | — | 432.4 |
| | Catalyst | Lithium acetylacetonate | — | 0.045 | 0.045 | 0.045 | — | — |
| | | Tetrabutyl titanate | — | — | — | — | — | 0.09 |
| | Composition | NIPPOLLAN 980R | — | — | — | — | 450.0 | — |
| | | PCP-2A | 800.0 | — | — | — | — | — |
| Analysis and evaluation | Number average molecular weight (g/mol) | | 370 | 246 | 249 | 276 | 210 | 265 |
| | Hydroxyl value (mg KOH/g) | | 308 | 703 | 686 | 623 | 656 | 855 |
| | State | 5° C. | Solid | Liquid | Liquid | Liquid | Solid | Liquid |
| | | 25° C. | Solid | Liquid | Liquid | Liquid | Solid | Liquid |
| | Composition analysis (1) $^1$H-NMR measurement | $C_{A1}/C_B$ | 0.061 | 0.106 | 0.192 | 0.195 | — | — |
| | | $C_{A1}/C_T$ | 0.080 | 0.065 | 0.115 | 0.100 | — | — |
| | | $C_B/C_T$ | 1.310 | 0.615 | 0.598 | 0.512 | 0.998 | 0.905 |
| | Composition analysis (2) LC-MS measurement | P3/[P3 + P4 + P5] | — | 0.85 | 0.84 | 0.75 | — | 1.00 |
| | | P5/[P3 + P4 + P5] | — | 0.01 | 0.01 | 0.04 | — | 0.00 |

In Table 2 and Table 3, "Composition" (unit: g) in Examples 1A to 4A and 6A to 9A, Reference Examples 2A to 4A, and Comparative Example 2A indicate a reaction raw material, and "Composition" (unit: g) in Example 5A, Reference Example 1A and Comparative Example 1A indicates a component added.

(Evaluation of Physical Properties)

A urethane cured film coating (film) was produced by the following method, and physical properties (tensile property, moisture and heat resistant property, texture property) were evaluated using the obtained film as a sample.

[Production of Urethane Cured Film]

First, the composition obtained above, a polyisocyanate component (C-2612), a urethanization catalyst, a phosphorus compound (JP508), and a dilution solvent were added at amounts (unit: g) shown in Table 4 and Table 5, and mixed in a 200 mL glass bottle. Immediately after the mixing, the mixed solution was poured onto release paper, and cast with a bar coater to form a film with a thickness of 200 μm. Next, the cast film was cured by heating under conditions at 25° C. for 30 minutes, at 50° C. for 30 minutes, at 80° C. for 30 minutes, at 120° C. for 1 hour, and at 50° C. for 18 hours, and thus a urethane cured film (film) was obtained.

[Evaluation of Tensile Property and Texture Property]

The tensile property and the texture property of the obtained film were measured under the following conditions according to JIS K6251. The results are shown in Table 4 and Table 5.

—Conditions—
Test device: Tensilon UTA-500 (commercially available from A&D Co., Ltd.)
Measurement conditions: 25° C.×50% RH
Head speed: 200 mm/min
Dumbbell No. 4

If the tensile strength was 10 MPa or more, and the elongation at break was 200% or more, it was determined that the tensile property was favorable, and if the 100% modulus was 5 MPa or less, it was determined that the texture property was favorable. Here, if the tensile strength was 3 MPa or more, there was no practical problem.

[Evaluation of Moisture and Heat Resistant Property]

The obtained film was left in a moist heat dryer at 80° C.×95% RH for 28 days to prepare a test piece. Then, the tensile strength of each test piece was measured by the same method as the tensile property. The tensile strength retention rate was obtained from the following Formula (1) and used as an index of the moisture and heat resistant property of the urethane resin. ESPEC CORP (commercially available from Espec Corporation) was used as a test device. The results are shown in Table 4 and Table 5.

$$\text{Tensile strength retention rate (\%)} = C/D \times 100 \quad (1)$$

C: Tensile strength (MPa) after moisture resistance test
D: Tensile strength (MPa) before moisture resistance test If the tensile strength retention rate was 80% or more, it was determined that the moisture and heat resistant property was favorable.

TABLE 4

| | | | Example 1A | Example 2A | Example 3A | Example 4A | Example 5A | Example 6A | Example 7A | Example 8A | Example 9A |
|---|---|---|---|---|---|---|---|---|---|---|---|
| Type of composition | | | PCP-1A | PCP-2A | PCP-3A | PCP-4A | PCP-5A | PCP-6A | PCP-7A | PCP-8A | PCP-9A |
| Formulation | Composition | | 28.2 | 29.6 | 20 | 23.2 | 21.7 | 24 | 20.2 | 19.7 | 14.2 |
| | Polyisocyanate component | C-2612 | 11.8 | 10.4 | 20 | 16.8 | 18.3 | 16 | 19.8 | 20.3 | 25.8 |
| | Urethanization catalyst | DOTDL | 0.01 | 0.01 | 0.01 | 0.01 | 0.01 | 0.01 | 0.01 | 0.01 | 0.01 |
| | Phosphorus compound | JP508 | 0.01 | 0.01 | 0.01 | 0.01 | 0.01 | 0.01 | 0.01 | 0.01 | 0.01 |
| | Dilution solvent | Methyl ethyl ketone | 42 | 42 | 42 | 42 | 42 | 42 | 42 | 42 | 42 |
| | | Toluene | 18 | 18 | 18 | 18 | 18 | 18 | 18 | 18 | 18 |
| | Molar ratio (isocyanate compound/hydroxy group) | | 1.02/1.0 | 1.02/1.0 | 1.02/1.0 | 1.02/1.0 | 1.02/1.0 | 1.02/1.0 | 1.02/1.0 | 1.02/1.0 | 1.02/1.0 |
| Physical properties | 100% modulus (MPa) | | 2.2 | 2.1 | 1.4 | 2.6 | 4.7 | 2.4 | 3.1 | 2.8 | 2.2 |
| | Tensile strength (MPa) | | 14 | 26 | 28 | 25 | 23 | 26 | 31 | 18 | 13 |
| | Tensile elongation (%) | | 380 | 390 | 400 | 370 | 300 | 350 | 300 | 350 | 310 |
| | Tensile strength retention rate (%) | | 101 | 102 | 85 | 81 | 105 | 86 | 91 | 90 | 70 |

TABLE 5

| | | | Reference Example 1A | Reference Example 2A | Reference Example 3A | Reference Example 4A | Comparative Example 1A | Comparative Example 2A |
|---|---|---|---|---|---|---|---|---|
| Type of composition | | | PCP-10A | PCP-11A | PCP-12A | PCP-13A | PCD-1A | PCP-14A |
| Formulation | Composition | | 16.9 | 9.7 | 9.9 | 10.6 | 10.2 | 8.3 |
| | Polyisocyanate component | C-2612 | 23.1 | 30.3 | 30.1 | 29.4 | 29.8 | 31.7 |
| | Urethanization catalyst | DOTDL | 0.01 | 0.01 | 0.01 | 0.01 | 0.01 | 0.01 |
| | Phosphorus compound | JP508 | 0.01 | 0.01 | 0.01 | 0.01 | 0.01 | 0.01 |
| | Dilution solvent | Methyl ethyl ketone | 42 | 42 | 42 | 42 | 42 | 42 |
| | | Toluene | 18 | 18 | 18 | 18 | 18 | 18 |
| | Molar ratio (isocyanate compound/hydroxy group) | | 1.02/1.0 | 1.02/1.0 | 1.02/1.0 | 1.02/1.0 | 1.02/1.0 | 1.02/1.0 |
| Physical properties | 100% modulus (MPa) | | 19.2 | 29.3 | 28.5 | 20.3 | 30.3 | 38.2 |
| | Tensile strength (MPa) | | 65 | 35 | 31 | 32 | 36 | 42 |
| | Tensile elongation (%) | | 200 | 80 | 90 | 120 | 130 | 50 |
| | Tensile strength retention rate (%) | | 100 | 100 | 102 | 103 | 99 | 101 |

Details of the materials used in the first example are as follows.
- 1,4-butanediol: commercially available from FUJIFILM Wako Pure Chemical Corporation
- 1,6-hexanediol: commercially available from BASF-JAPAN
- Trimethylolpropane: commercially available from Sigma-Aldrich
- Trimethylolethane: commercially available from FUJIFILM Wako Pure Chemical Corporation
- Pentaerythritol: commercially available from FUJIFILM Wako Pure Chemical Corporation
- Diethyl carbonate: commercially available from Sigma-Aldrich
- Dimethyl carbonate: commercially available from FUJIFILM Wako Pure Chemical Corporation
- Lithium acetylacetonate: commercially available from Sigma-Aldrich
- Lithium hydroxide: commercially available from Tokyo Chemical Industry Co., Ltd.
- Tetrabutyl titanate: commercially available from Tokyo Chemical Industry Co., Ltd.
- NIPPOLLAN 980R: product name, 1,6-hexanediol-based polycarbonate diol, hydroxyl value=56 KOH mg/g, f=2, commercially available from Tosoh Corporation
- JP-508: product name, 2-ethylhexyl acid phosphate, commercially available from Jouhoku Chemical Industry
- C-2612: Coronate 2612 (product name), hexamethylene diisocyanate adduct-modified polyisocyanate, isocyanate content=17.2%, commercially available from Tosoh Corporation
- DOTDL: dioctyltin dilaurate, commercially available from Kishida Chemical Co., Ltd.
- Methyl ethyl ketone: commercially available from Maruzen Petrochemical Co., Ltd.
- Toluene: commercially available from FUJIFILM Wako Pure Chemical Corporation Second Example Example 1B 35.2 g of trimethylolpropane, 298.5 g of 1,6-hexanediol, 97.5 g of 1,4-butanediol, 468.8 g of diethyl carbonate, and 0.045 g of lithium acetylacetonate were mixed in a 1 L 2-neck glass reactor including a stirrer, a thermometer, a heating device and a cooler. The obtained mixed solution was heated at 130 to 150° C. (initial 130° C., final stage 150° C.) under normal pressure, and reacted for 8 hours while removing low-boiling-point components (an alcohol derived from the carbonate ester and the like). The distillate temperature was 77° C. or higher and less than 79° C. In addition, the pressure in the flask was reduced to 1 kPa at a reaction temperature of 150° C., the reaction was additionally performed for 8 hours, and thus a composition (PCP-1B) containing a polycarbonate polyol represented by Formula (A-1) was obtained.

Example 2B

A composition (PCP-2B) containing a polycarbonate polyol represented by Formula (A-1) was obtained in the same manner as in Example 1B except that a mixed solution obtained by mixing 34.6 g of trimethylolpropane, 218.4 g of 1,6-hexanediol, 166.6 g of 1,4-butanediol, 480.4 g of diethyl carbonate, and 0.045 g of lithium acetylacetonate was used.

Example 3B

A composition (PCP-3B) containing a polycarbonate polyol represented by Formula (A-1) was obtained in the same manner as in Example 1B except that a mixed solution obtained by mixing 75.6 g of trimethylolpropane, 358.2 g of 1,6-hexanediol, 30.4 g of 1,4-butanediol, 426.1 g of diethyl carbonate, and 0.045 g of lithium acetylacetonate was used.

Example 4B

A composition (PCP-4B) containing a polycarbonate polyol represented by Formula (A-1) was obtained in the same manner as in Example 1B except that a mixed solution obtained by mixing 37.3 g of trimethylolpropane, 273.7 g of 1,6-hexanediol, 159.1 g of 1,9-nonanediol, 432.8 g of diethyl carbonate, and 0.045 g of lithium acetylacetonate was used.

Example 5B

A composition (PCP-5B) containing a polycarbonate polyol represented by Formula (A-1) was obtained by mixing 900 g of the composition (PCP-1B) obtained in Example 1B and 100 g of trimethylolpropane at 80° C.

Example 6B

A composition (PCP-6B) containing a polycarbonate polyol represented by Formula (A-1) was obtained in the same manner as in Example 1B except that a mixed solution obtained by mixing 31.4 g of trimethylolethane, 299.8 g of 1,6-hexanediol, 98.0 g of 1,4-butanediol, 470.8 g of diethyl carbonate, and 0.045 g of lithium acetylacetonate was used.

Example 7B

A composition (PCP-7B) containing a polycarbonate polyol represented by Formula (A-1) was obtained in the same manner as in Example 1B except that a mixed solution obtained by mixing 35.8 g of pentaerythritol, 298.3 g of 1,6-hexanediol, 97.5 g of 1,4-butanediol, 468.5 g of diethyl carbonate, and 0.045 g of lithium acetylacetonate was used.

Example 8B

A composition (PCP-8B) containing a polycarbonate polyol represented by Formula (A-1) was obtained in the same manner as in Example 1B except that a mixed solution obtained by mixing 35.8 g of trimethylolpropane, 374.7 g of 1,6-hexanediol, 31.7 g of 1,4-butanediol, 453.0 g of diethyl carbonate, and 0.045 g of lithium acetylacetonate was used.

Reference Example 1B

A composition (PCP-9B) containing a polycarbonate polyol represented by Formula (A-1) was obtained by mixing 800 g of the composition (PCP-1B) obtained in Example 1B and 200 g of trimethylolpropane at 80° C.

Comparative Example 1B

A composition (PCD-1B) containing a polycarbonate diol was obtained in the same manner as in Example 1B except that a mixed solution obtained by mixing 196 g of 1,6- hexanediol, 172.8 g of 1,5-pentanediol, 431.2 g of diethyl carbonate, and 0.045 g of lithium acetylacetonate was used.

Comparative Example 2B

A composition (PCD-2B) containing a polycarbonate diol was obtained by mixing 450 g of the composition (PCD-1B) obtained in Comparative Example 1B and 450 g of trimethylolpropane at 80° C.

(Analysis and Evaluation)

Figure 4:
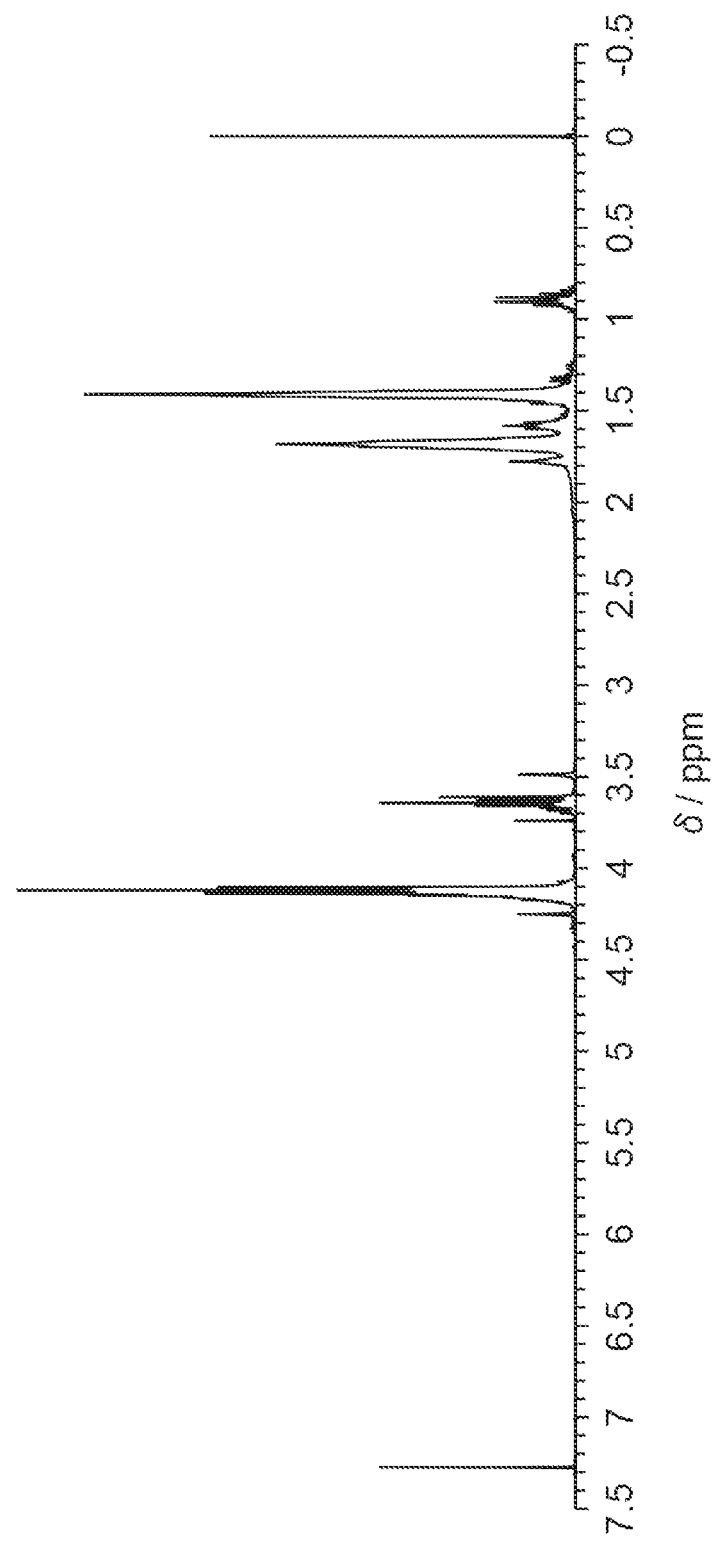
FIG. 4 is a diagram showing an $^1$H-NMR spectrum of a composition containing a polycarbonate polyol obtained in Example 1B.
Figure 5:
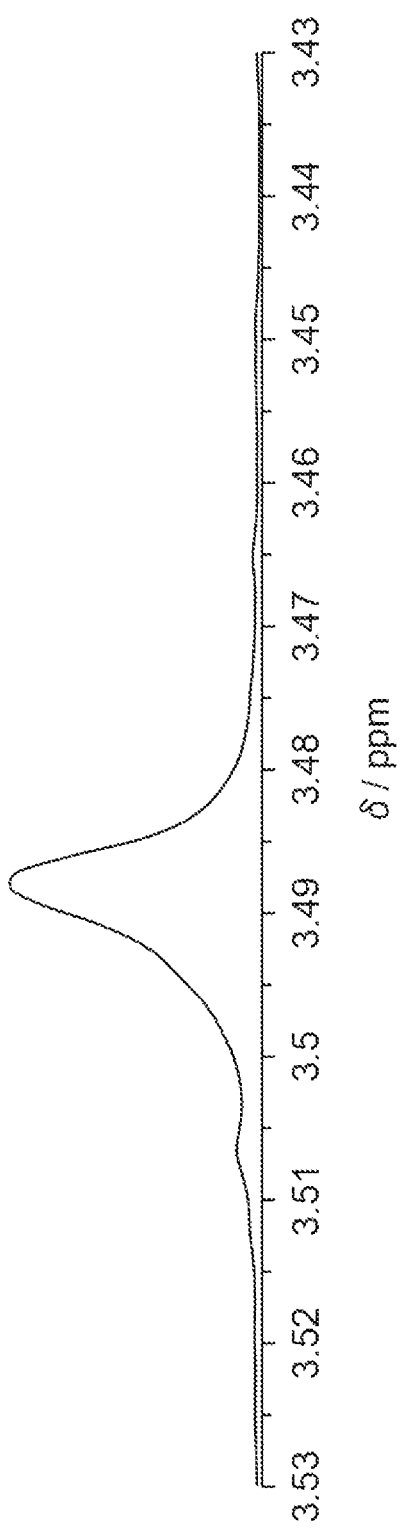
FIG. 5 is a diagram of the $^1$H-NMR spectrum of the composition containing the polycarbonate polyol obtained in Example 1B, which is enlarged in a range of 3.430 ppm or more and 3.530 ppm or less.
Figure 6:
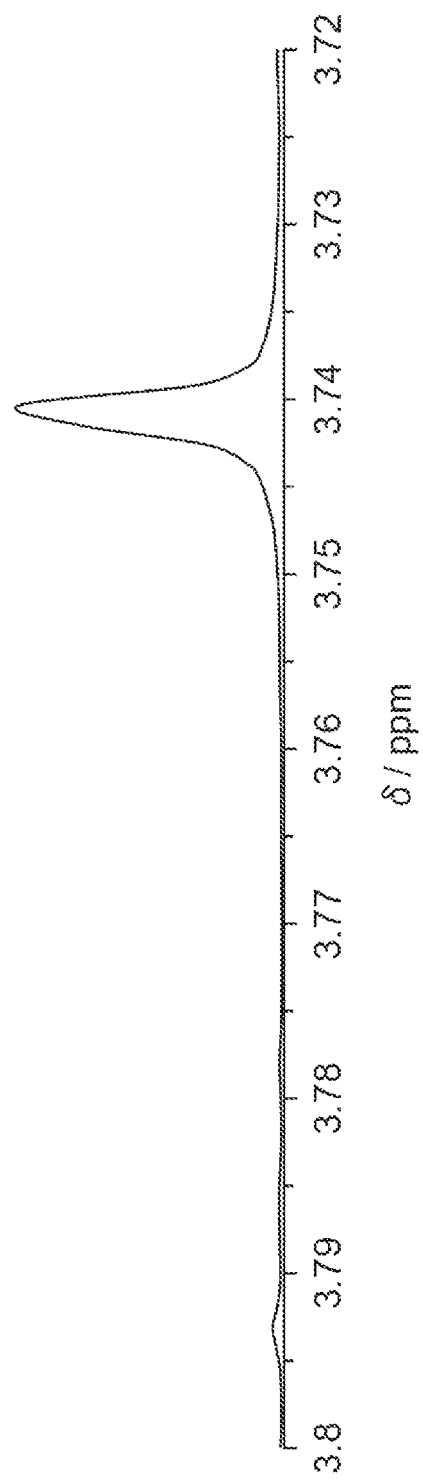
FIG. 6 is a diagram of the $^1$H-NMR spectrum of the composition containing the polycarbonate polyol obtained in Example 1B, which is enlarged in a range of 3.720 ppm or more and 3.800 ppm or less.

In the same manner as in the first example, the number average molecular weight and the hydroxyl value of the composition obtained above were measured, and state evaluation and composition analysis (1) were performed. In the composition analysis (1), the signal in a range of 3.430 ppm or more and 3.530 ppm or less was set as the signal (S1), the signal in a range of 3.720 ppm or more and 3.800 ppm or less was set as the signal (S2), the signal in a range of 0.700 ppm or more and 1.130 ppm or less was set as the signal (S3) when $R^1$ of the group represented by Formula (I) was a methyl group (when the multivalent alcohol (B) was trimethylolethane), and the signal in a range of 0.700 ppm or more and 1.000 ppm or less was set as the signal (S3) when IV of the group represented by Formula (I) was an ethyl group (when the multivalent alcohol (B) was trimethylolpropane). The results are shown in Table 6 and Table 7. In addition, for reference, FIG. 4 to FIG. 6 show the $^1$H-NMR spectrum of the composition obtained in Example 1B. Here, as a result of the composition analysis (1), in PCP-1B to 9B, the presence of the compound (A-1) was suggested according to the presence of the signal (S1). On the other hand, in PCD-1B to 2B, no signal (S1) was confirmed. In addition, in PCP-1B to 9B, the presence of the compound (A-2) was suggested according to the presence of the signal (S4) in a range of 3.550 ppm or more and 3.620 ppm or less. In addition, in PCP-1B to 6B and PCP-8B to 9B, it was confirmed that the values obtained by subtracting $C_{A1}$, $C_{A2}$ and $C_B$ from $C_T$ ware positive according to the integral value of the signals (S1) to (S4), and thus the presence of the compound (A-3) was suggested.

TABLE 6

| | | | Example 1B | Example 2B | Example 3B | Example 4B | Example 5B | Example 6B | Example 7B |
|---|---|---|---|---|---|---|---|---|---|
| Composition | | | PCP-1B | PCP-2B | PCP-3B | PCP-4B | PCP-5B | PCP-6B | PCP-7B |
| Composition | Diol (D) | 1,4-butanediol | 97.5 | 166.6 | 30.4 | — | — | 98.0 | 97.5 |
| | | 1,6-hexanediol | 298.5 | 218.4 | 358.2 | 273.7 | — | 299.8 | 298.3 |
| | | 1,9-nonanediol | — | — | — | 159.1 | — | — | — |
| | Multivalent alcohol (B) | Trimethylolpropane | 35.2 | 34.6 | 75.6 | 37.3 | 100.0 | — | — |
| | | Trimethylolethane | — | — | — | — | — | 31.4 | — |
| | | Pentaerythritol | — | — | — | — | — | — | 35.8 |
| | Carbonate ester | Diethyl carbonate | 468.8 | 480.4 | 426.1 | 432.8 | — | 470.8 | 468.5 |
| | Catalyst | Lithium acetylacetonate | 0.045 | 0.045 | 0.045 | 0.045 | — | 0.045 | 0.045 |
| | Composition | PCP-1B | — | — | — | — | 900.0 | — | — |
| Analysis and evaluation | Number average molecular weight (g/mol) | | 2190 | 1610 | 1020 | 2080 | 640 | 1720 | 1650 |
| | Hydroxyl value (mg KOH/g) | | 78 | 85 | 182 | 81 | 198 | 81 | 83 |
| | State | 5° C. | Liquid | Liquid | Liquid | Liquid | Liquid | Liquid | Liquid |
| | | 25° C. | Liquid | Liquid | Liquid | Liquid | Liquid | Liquid | Liquid |
| | Composition analysis (1) $^1$H-NMR measurement | $C_{A1}/C_B$ | 26.407 | 25.602 | 8.100 | 31.854 | 0.141 | 25.750 | 4.520 |
| | | $C_{A1}/C_T$ | 0.430 | 0.425 | 0.405 | 0.420 | 0.105 | 0.412 | — |
| | | $C_B/C_T$ | 0.016 | 0.017 | 0.050 | 0.013 | 0.747 | 0.016 | — |

TABLE 7

| | | | Example 8B | Reference Example 1B | Comparative Example 1B | Comparative Example 2B |
|---|---|---|---|---|---|---|
| Composition | | | PCP-8B | PCP-9B | PCD-1B | PCD-2B |
| Composition | Diol (D) | 1,4-butanediol | 31.7 | — | — | — |
| | | 1,5-pentanediyl | — | — | 172.8 | — |
| | | 1,6-hexanediol | 374.7 | — | 196.0 | — |
| | Multivalent alcohol (B) | Trimethylolpropane | 35.8 | 200.0 | — | 450.0 |
| | Carbonate ester | Diethyl carbonate | 453.0 | — | 431.2 | — |
| | Catalyst | Lithium acetylacetonate | 0.045 | — | 0.045 | — |
| | Composition | PCD-1B | — | — | — | 450.0 |
| | | PCP-1B | — | 800.0 | — | — |
| Analysis and evaluation | Number average molecular weight (g/mol) | | 2470 | 370 | 1710 | 210 |
| | Hydroxyl value (mg KOH/g) | | 68 | 316 | 55.9 | 650 |
| | State | 5° C. | Solid | Solid | Liquid | Solid |
| | | 25° C. | Solid | Solid | Liquid | Solid |
| | Composition analysis (1) $^1$H-NMR measurement | $C_{A1}/C_B$ | 34.791 | 0.097 | — | — |
| | | $C_{A1}/C_T$ | 0.435 | 0.080 | — | — |
| | | $C_B/C_T$ | 0.013 | 0.825 | — | 0.998 |

In Table 6 and Table 7, "Composition" (unit: g) in Examples 1B to 4B and 6B to 8B and Comparative Example 1B indicate a reaction raw material, and "Composition" (unit: g) in Example 5B, Reference Example 1B and Comparative Example 2B indicate a component added.

(Evaluation of Physical Properties)

A urethane cured film (film) was obtained in the same manner as in the first example except that the composition obtained above, a polyisocyanate component (C-2612), a urethanization catalyst, a phosphate ester (JP508), and a dilution solvent were added at amounts (unit: g) shown in Table 8 and Table 9. Next, in the same manner as in the first example, using the obtained film as a sample, physical properties (tensile property, moisture and heat resistant property, and texture property) were evaluated. The results are shown in Table 8 and Table 9. Here, physical properties of Comparative Example 1B were not evaluated.

TABLE 8

| | | | Example 1B | Example 2B | Example 3B | Example 4B | Example 5B | Example 6B | Example 7B |
|---|---|---|---|---|---|---|---|---|---|
| Type of composition | | | PCP-1B | PCP-2B | PCP-3B | PCP-4B | PCP-5B | PCP-6B | PCP-7B |
| Formulation | Composition | | 29.7 | 29 | 22.1 | 29.4 | 21.3 | 29.4 | 29.2 |
| | Polyisocyanate component | C-2612 | 10.3 | 11 | 17.9 | 10.6 | 18.7 | 10.6 | 10.8 |
| | Urethanization catalyst | DOTDL | 0.01 | 0.01 | 0.01 | 0.01 | 0.01 | 0.01 | 0.01 |
| | Phosphorus compound | JP508 | 0.01 | 0.01 | 0.01 | 0.01 | 0.01 | 0.01 | 0.01 |
| | Dilution solvent | Methyl ethyl ketone | 42 | 42 | 42 | 42 | 42 | 42 | 42 |
| | | Toluene | 18 | 18 | 18 | 18 | 18 | 18 | 18 |
| | Molar ratio (isocyanate compound/hydroxy group) | | 1.02/1.0 | 1.02/1.0 | 1.02/1.0 | 1.02/1.0 | 1.02/1.0 | 1.02/1.0 | 1.02/1.0 |
| Physical properties | 100% modulus (MPa) | | 2.0 | 2.2 | 2.7 | 2.7 | 3.3 | 2.1 | 2.5 |
| | Tensile strength (MPa) | | 17.5 | 15.3 | 27.0 | 30.0 | 31.4 | 17.3 | 18.9 |
| | Tensile elongation (%) | | 400 | 400 | 300 | 300 | 300 | 400 | 300 |
| | Tensile strength retention rate (%) | | 102 | 106 | 88 | 91 | 98 | 101 | 100 |

TABLE 9

| | | | Example 8B | Reference Example 1B | Comparative Example 2B |
|---|---|---|---|---|---|
| Type of composition | | | PCP-8B | PCP-9B | PCD-2B |
| Formulation | Composition | | 30.7 | 16.6 | 10.2 |
| | Polyisocyanate component | C-2612 | 9.3 | 23.4 | 29.8 |
| | Urethanization catalyst | DOTDL | 0.01 | 0.01 | 0.01 |
| | Phosphorus compound | JP508 | 0.01 | 0.01 | 0.01 |
| | Dilution solvent | Methyl ethyl ketone | 42 | 42 | 42 |
| | | Toluene | 18 | 18 | 18 |
| | Molar ratio (isocyanate compound/hydroxy group) | | 1.02/1.0 | 1.02/1.0 | 1.02/1.0 |
| Physical properties | 100% modulus (MPa) | | 1.9 | 10.0 | 35.2 |
| | Tensile strength (MPa) | | 28.5 | 34.5 | 40 |
| | Tensile elongation (%) | | 400 | 230 | 100 |
| | Tensile strength retention rate (%) | | 99 | 98 | 102 |

Details of the materials used in the second example are as follows.
- 1,4-butanediol: commercially available from FUJIFILM Wako Pure Chemical Corporation
- 1,5-pentanediol: commercially available from FUJIFILM Wako Pure Chemical Corporation
- 1,6-hexanediol: commercially available from BASF-JAPAN
- 1,9-nonanediol: commercially available from Kuraray Co., Ltd.
- Trimethylolpropane: commercially available from Sigma-Aldrich
- Trimethylolethane: commercially available from FUJIFILM Wako Pure Chemical Corporation
- Pentaerythritol: commercially available from FUJIFILM Wako Pure Chemical Corporation
- Lithium hydroxide: commercially available from Tokyo Chemical Industry Co., Ltd.
- Tetrabutyl titanate: commercially available from Tokyo Chemical Industry Co., Ltd.
- Diethyl carbonate: commercially available from Sigma-Aldrich
- Dimethyl carbonate: commercially available from FUJIFILM Wako Pure Chemical Corporation
- Lithium acetylacetonate: commercially available from Sigma-Aldrich
- JP-508: product name, 2-ethylhexyl acid phosphate, commercially available from Jouhoku Chemical Industry
- C-2612: Coronate 2612 (product name), hexamethylene diisocyanate adduct-modified polyisocyanate, isocyanate content=17.2%, commercially available from Tosoh Corporation
- DOTDL: dioctyltin dilaurate, commercially available from Kishida Chemical Co., Ltd.
- Methyl ethyl ketone: commercially available from Maruzen Petrochemical Co., Ltd.
- Toluene: commercially available from FUJIFILM Wako Pure Chemical Corporation Third Example Example 1C 36.1 g of trimethylolpropane, 288 g of 1,6-hexanediol, 123.4 g of 3-methyl-1,5-pentanediol, 452.4 g of diethyl carbonate, and 0.045 g of lithium acetylacetonate were put into and mixed in a 1 L 2-neck glass reactor including a stirrer, a thermometer, a heating device and a cooler. The obtained mixed solution was heated at 130 to 150° C. (initial 130° C., final stage 150° C.) under normal pressure, and reacted for 8 hours while removing low-boiling-point components (an alcohol derived from the carbonate ester and the like). The distillate temperature was 77° C. or higher and less than 79° C. In addition, the pressure in the flask was reduced to 1 kPa at a reaction temperature of 150° C., the reaction was additionally performed for 8 hours, and thus a composition (PCP-1C) containing a polycarbonate polyol represented by Formula (A-1) was obtained.

Example 2C

A composition (PCP-2C) containing a polycarbonate polyol represented by Formula (A-1) was obtained in the same manner as in Example 1C except that a mixed solution obtained by adding and mixing 36.2 g of trimethylolpropane, 205.7 g of 1,6-hexanediol, 205.7 g of 3-methyl-1,5-pentanediol, 452.3 g of diethyl carbonate and 0.045 g of lithium acetylacetonate was used.

Example 3C

A composition (PCP-3C) containing a polycarbonate polyol represented by Formula (A-1) was obtained in the same manner as in Example 1C except that a mixed solution obtained by adding and mixing 36.2 g of trimethylolpropane, 411.5 g of 3-methyl-1,5-pentanediol, 452.3 g of diethyl carbonate and 0.045 g of lithium acetylacetonate was used.

Example 4C

A composition (PCP-4C) containing a polycarbonate polyol represented by Formula (A-1) was obtained in the same manner as in Example 1C except that a mixed solution obtained by adding and mixing 74.3 g of trimethylolpropane, 353.9 g of 1,6-hexanediol, 39.3 g of 3-methyl-1,5-pentanediol, 432.4 g of diethyl carbonate and 0.045 g of lithium acetylacetonate was used.

Example 5C

A composition (PCP-5C) containing a polycarbonate polyol represented by Formula (A-1) was obtained in the same manner as in Example 1C except that a mixed solution obtained by adding and mixing 60.4 g of trimethylolpropane, 865.4 g of ND-15, 701.7 g of diethyl carbonate and 0.06 g of lithium acetylacetonate was used.

Example 6C

A composition (PCP-6C) containing a polycarbonate polyol represented by Formula (A-1) was obtained by mixing 900 g of the composition (PCP-1C) obtained in Example 1C and 100 g of trimethylolpropane at 80° C.

Example 7C

A composition (PCP-7C) containing a polycarbonate polyol represented by Formula (A-1) was obtained in the same manner as in Example 1C except that a mixed solution obtained by adding and mixing 32.2 g of trimethylolethane, 289.3 g of 1,6-hexanediol, 124.0 g of 3-methyl-1,5-pentanediol, 454.5 g of diethyl carbonate and 0.045 g of lithium acetylacetonate was used.

Example 8C

A composition (PCP-8C) containing a polycarbonate polyol represented by Formula (A-1) was obtained in the same manner as in Example 1C except that a mixed solution obtained by adding and mixing 36.6 g of pentaerythritol, 287.8 g of 1,6-hexanediol, 123.4 g of 3-methyl-1,5-pentanediol, 452.1 g of diethyl carbonate and 0.045 g of lithium acetylacetonate was used.

Example 9C

A composition (PCP-9C) containing a polycarbonate polyol represented by Formula (A-1) was obtained in the same manner as in Example 1C except that a mixed solution obtained by adding and mixing 36.1 g of trimethylolpropane, 370.3 g of 1,6-hexanediol, 41.1 g of 3-methyl-1,5- pentanediol, 452.4 g of diethyl carbonate and 0.045 g of lithium acetylacetonate was used.

Reference Example 1C

A composition (PCP-10C) containing a polycarbonate polyol represented by Formula (A-1) was obtained by mixing 800 g of the composition (PCP-1C) obtained in Example 1C and 200 g of trimethylolpropane at 80° C.

(Analysis and Evaluation)

Figure 7:
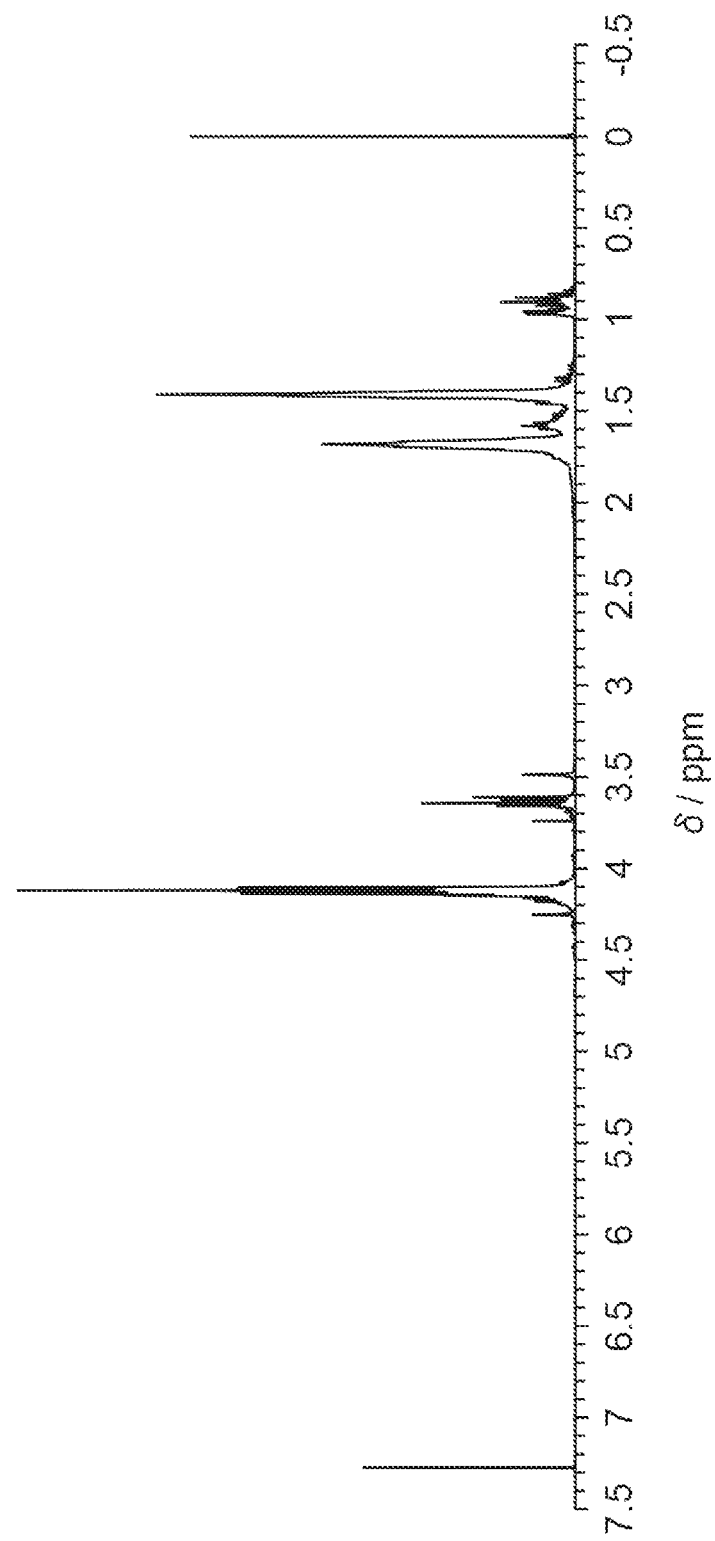
FIG. 7 is a diagram showing an $^1$H-NMR spectrum of a composition containing a polycarbonate polyol obtained in Example 1C.
Figure 8:
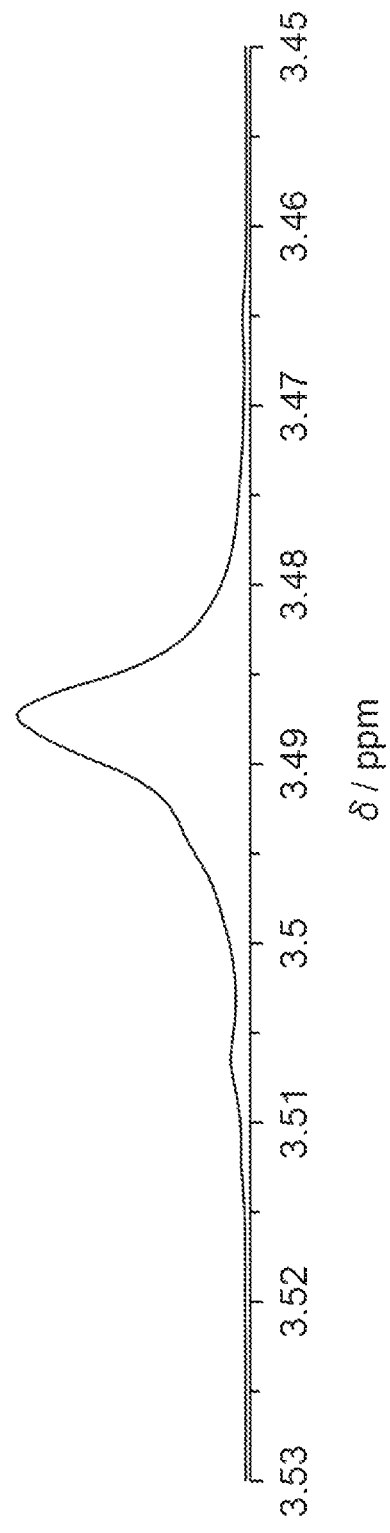
FIG. 8 is a diagram of the $^1$H-NMR spectrum of the composition containing the polycarbonate polyol obtained in Example 1C, which is enlarged in a range of 3.450 ppm or more and 3.530 ppm or less.
Figure 9:
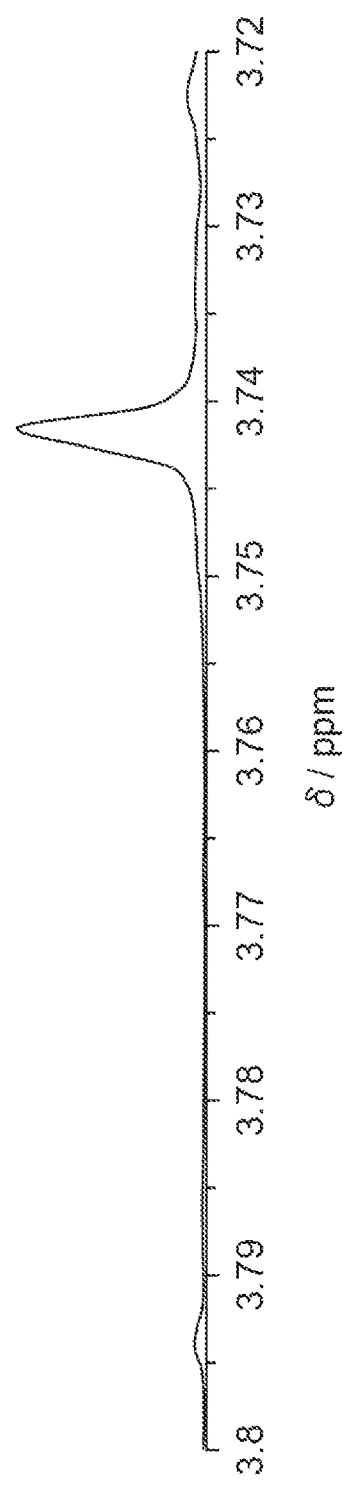
FIG. 9 is a diagram of the $^1$H-NMR spectrum of the composition containing the polycarbonate polyol obtained in Example 1C, which is enlarged in a range of 3.720 ppm or more and 3.800 ppm or less.

In the same manner as in the first example, the number average molecular weight and the hydroxyl value of the composition obtained above were measured, and state evaluation and composition analysis (1) were performed. In the composition analysis (1), the signal in a range of 3.450 ppm or more and 3.530 ppm or less was set as the signal (S1), and the signal in a range of 3.720 ppm or more and 3.800 ppm or less was set as the signal (S2). The results are shown in Table 10. In addition, for reference, FIG. 7 to FIG. 9 show the $^1$H-NMR spectrum of the composition obtained in Example 1C. As a result of the composition analysis (1), in PCP-1C to 10C, the presence of the compound (A-1) was suggested according to the presence of the signal (S1), and the presence of the compound (A-2) was suggested according to the presence of the signal (S4) in a range of 3.550 ppm or more and 3.620 ppm or less.

TABLE 10

| | | | Example 1C | Example 2C | Example 3C | Example 4C | Example 5C |
|---|---|---|---|---|---|---|---|
| Composition | | | PCP-1C | PCP-2C | PCP-3C | PCP-4C | PCP-5C |
| Composition | Diol (D) | 3-methyl-1,5-pentanediol | 123.4 | 205.7 | 411.5 | 39.3 | — |
| | | 1,6-hexanediol | 288 | 205.7 | — | 353.9 | — |
| | | ND-15 | — | — | — | — | 865.4 |
| | Multivalent alcohol (B) | Trimethylolpropane | 36.1 | 36.2 | 36.2 | 74.3 | 60.4 |
| | | Trimethylolethane | — | — | — | — | — |
| | | Pentaerythritol | — | — | — | — | — |
| | Carbonate ester | Diethyl carbonate | 452.4 | 452.3 | 452.3 | 432.4 | 701.7 |
| | Catalyst | Lithium acetylacetonate | 0.045 | 0.045 | 0.045 | 0.045 | 0.06 |
| | Composition | PCP-1C | — | — | — | — | — |
| Analysis and evaluation | Number average molecular weight (g/mol) | | 2120 | 2230 | 2310 | 1340 | 3030 |
| | Hydroxyl value (mg KOH/g) | | 79 | 73 | 73 | 156 | 54 |
| | State | 5° C. | Liquid | Liquid | Liquid | Liquid | Liquid |
| | | 25° C. | Liquid | Liquid | Liquid | Liquid | Liquid |
| | Composition analysis (1) $^1$H-NMR measurement | $C_{A1}/C_B$ | 8.434 | 6.725 | 2.712 | 9.706 | 46.053 |

| | | | Example 6C | Example 7C | Example 8C | Example 9C | Reference Example 1C |
|---|---|---|---|---|---|---|---|
| Composition | | | PCP-6C | PCP-7C | PCP-8C | PCP-9C | PCP-10C |
| Composition | Diol (D) | 3-methyl-1,5-pentanediol | — | 124 | 123.4 | 41.1 | — |
| | | 1,6-hexanediol | — | 289.3 | 287.8 | 370.3 | — |
| | | ND-15 | — | — | — | — | — |
| | Multivalent alcohol (B) | Trimethylolpropane | 100 | — | — | 36.1 | 200 |
| | | Trimethylolethane | — | 32.2 | — | — | — |
| | | Pentaerythritol | — | — | 36.6 | — | — |
| | Carbonate ester | Diethyl carbonate | — | 454.5 | 452.1 | 452.4 | — |
| | Catalyst | Lithium acetylacetonate | — | 0.045 | 0.045 | 0.045 | — |
| | Composition | PCP-1C | 900 | — | — | — | 800 |
| Analysis and evaluation | Number average molecular weight (g/mol) | | 620 | 2150 | 2270 | 2370 | 380 |
| | Hydroxyl value (mg KOH/g) | | 198 | 78 | 75 | 71 | 316 |
| | State | 5° C. | Liquid | Liquid | Liquid | Solid | Solid |
| | | 25° C. | Liquid | Liquid | Liquid | Solid | Solid |
| | Composition analysis (1) $^1$H-NMR measurement | $C_{A1}/C_B$ | 0.234 | 7.083 | 4.952 | 12.500 | 0.091 |

In Table 10, "Composition" (unit: g) in Examples 1C to 5C and 7C to 9C indicate a reaction raw material, and "Composition" (unit: g) in Example 6C and Reference Example 1C indicate a component added.

(Evaluation of Physical Properties)

A urethane cured film (film) was obtained in the same manner as in the first example except that the composition obtained above, a polyisocyanate component (C-2612), a urethanization catalyst, a phosphate ester (JP508), and a dilution solvent were added at amounts (unit: g) shown in Table 11. Next, in the same manner as in the first example, using the obtained film as a sample, physical properties (tensile property, moisture and heat resistant property, and texture property) were evaluated. The results are shown in Table 11.

Lithium acetylacetonate: commercially available from Sigma-Aldrich

JP-508: 2-ethylhexyl acid phosphate, product name commercially available from Jouhoku Chemical Industry C-2612: Coronate 2612 (product name), hexamethylene diisocyanate adduct-modified polyisocyanate, isocyanate content=17.2%, commercially available from Tosoh Corporation DOTDL: dioctyltin dilaurate, commercially available from Kishida Chemical Co., Ltd.

Methyl ethyl ketone: commercially available from Maruzen Petrochemical Co., Ltd.

Toluene: commercially available from FUJIFILM Wako Pure Chemical Corporation

TABLE 11

| | | | Example 1C | Example 2C | Example 3C | Example 4C | Example 5C | Example 6C | Example 7C | Example 8C | Example 9C | Reference Example 1C |
|---|---|---|---|---|---|---|---|---|---|---|---|---|
| Type of composition | | | PCP-1C | PCP-2C | PCP-3C | PCP-4C | PCP-5C | PCP-6C | PCP-7C | PCP-8C | PCP-9C | PCP-10C |
| Formulation | Composition | | 29.6 | 30.2 | 30.2 | 23.6 | 32.3 | 21.3 | 29.7 | 30 | 30.4 | 16.6 |
| | Polyisocyanate component | C-2612 | 10.4 | 9.8 | 9.8 | 16.4 | 7.7 | 18.7 | 10.3 | 10 | 9.6 | 23.4 |
| | Urethanization catalyst | DOTDL | 0.01 | 0.01 | 0.01 | 0.01 | 0.01 | 0.01 | 0.01 | 0.01 | 0.01 | 0.01 |
| | Phosphorus compound | JP508 | 0.01 | 0.01 | 0.01 | 0.01 | 0.01 | 0.01 | 0.01 | 0.01 | 0.01 | 0.01 |
| | Dilution solvent | Methyl ethyl ketone | 42 | 42 | 42 | 42 | 42 | 42 | 42 | 42 | 42 | 42 |
| | | Toluene | 18 | 18 | 18 | 18 | 18 | 18 | 18 | 18 | 18 | 18 |
| | Molar ratio (isocyanate compound/hydroxy group) | | 1.02/1.0 | 1.02/1.0 | 1.02/1.0 | 1.02/1.0 | 1.02/1.0 | 1.02/1.0 | 1.02/1.0 | 1.02/1.0 | 1.02/1.0 | 1.02/1.0 |
| Physical properties | 100% modulus (MPa) | | 2.0 | 2.1 | 1.9 | 2.4 | 1.5 | 3.6 | 2 | 2.5 | 2.0 | 11.2 |
| | Tensile strength (MPa) | | 7.3 | 6.1 | 4.0 | 3.8 | 25.0 | 27.1 | 3 | 27.4 | 20.5 | 32.8 |
| | Tensile elongation (%) | | 300 | 300 | 500 | 300 | 400 | 300 | 300 | 250 | 300 | 200 |
| | Tensile strength retention rate (%) | | 102 | 100 | 105 | 87 | 100 | 103 | 105 | 101 | 98 | 100 |

Details of the materials used in the third example are as follows.

3-methyl-1,5-pentanediol: commercially available from Kuraray Co., Ltd.

1,5-pentanediol: commercially available from FUJIFILM Wako Pure Chemical Corporation 1,6-hexanediol: commercially available from BASF-JAPAN ND-15: 1,9-nonane diol/2-methyl-1,8-octanediol mixture, commercially available from Kuraray Co., Ltd., product name Trimethylolpropane: commercially available from Sigma-Aldrich Trimethylolethane: commercially available from FUJIFILM Wako Pure Chemical Corporation Pentaerythritol: commercially available from FUJIFILM Wako Pure Chemical Corporation Lithium hydroxide: commercially available from Tokyo Chemical Industry Co., Ltd.

Tetrabutyl titanate: commercially available from Tokyo Chemical Industry Co., Ltd.

Diethyl carbonate: commercially available from Sigma-Aldrich

Dimethyl carbonate: commercially available from FUJIFILM Wako Pure Chemical Corporation

The invention claimed is:

1. A polycarbonate polyol represented by the following Formula (A-1):

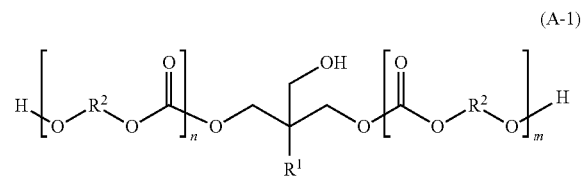

(A-1)

in Formula (A-1), $R^1$ represents a hydrogen atom or an alkyl group, $R^2$ represents an alkanediyl group, n and m each represent an integer of 1 or more; and a plurality of $R^2$'s may be the same as or different from each other.

2. The polycarbonate polyol according to claim 1, wherein all of $R^2$'s are linear alkanediyl groups.

3. The polycarbonate polyol according to claim 1, wherein at least one of $R^2$'s is a branched alkanediyl group.

4. A composition containing the polycarbonate polyol according to claim 1 and a multivalent alcohol represented by the following Formula (B):

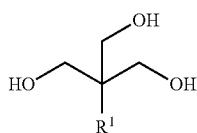
(B)

in Formula (B), $R^1$ represents a hydrogen atom or an alkyl group.

5. The composition according to claim 4,
wherein, when a total number of moles of the group represented by the following Formula (a-1) contained in the composition is $C_{A1}$ and a total number of moles of the multivalent alcohol contained in the composition is $C_B$, the molar ratio $(C_{A1}/C_B)$ is 0.1 to 150:

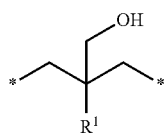
(a-1)

in Formula (a-1), * indicates a bond to a carbonate group.

6. The composition according to claim 4, further containing a compound (A-2) represented by the following Formula (A-2) and a compound (A-3) represented by the following Formula (A-3):

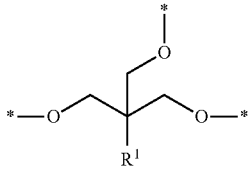
(A-2)

in Formula (A-2), $R^1$ represents a hydrogen atom or an alkyl group, $R^2$ represents an alkanediyl group, $n^2$ represents an integer of 1 or more; and when there are 2 or more $n^2$'s, the plurality of $R^2$'s may be the same as or different from each other, and

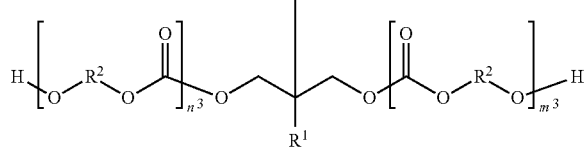
(A-3)

in Formula (A-3), $R^1$ represents a hydrogen atom or an alkyl group, $R^2$ represents an alkanediyl group, $n^3$, $m^3$ and $p^3$ each represent an integer of 1 or more; and a plurality of $R^2$'s may be the same as or different from each other.

7. The composition according to claim 4,
wherein, when a total number of moles of the group represented by the following Formula (a-1) contained in the composition is $C_{A1}$ and a total number of moles of the group represented by the following Formula (I) contained in the composition is $C_T$, the molar ratio $(C_{A1}/C_T)$ is 0.10 to 0.99:

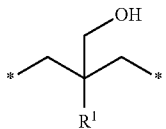
(a-1)

in Formula (a-1), * indicates a bond to a carbonate group, and

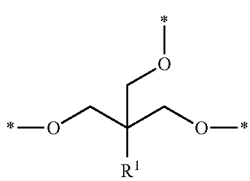
(I)

in Formula (I), $R^1$ represents a hydrogen atom or an alkyl group, and * indicates a bond.

8. The composition according to claim 4,
wherein, when a total number of moles of the multivalent alcohol contained in the composition is $C_B$, and a total number of moles of the groups represented by the following Formula (I) contained in the composition is $C_T$, the molar ratio $(C_B/C_T)$ is 0.001 to 0.900:

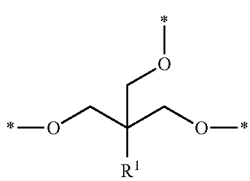
(I)

in Formula (I), $R^1$ represents a hydrogen atom or an alkyl group, and * indicates a bond.

9. A urethane resin which is a polycondensate of a polyol component and a polyisocyanate component or a crosslinked product thereof,
wherein the polyol component contains the polycarbonate polyol according to claim 1.

10. The urethane resin according to claim 9,
wherein the polyol component further includes a multivalent alcohol represented by the following Formula (B):

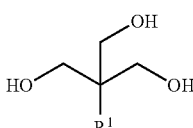
(B)

in Formula (B), $R^1$ represents a hydrogen atom or an alkyl group.

11. The urethane resin according to claim 10,
wherein, when a total number of moles of the group represented by the following Formula (a-1) contained in the polyol component is $C_{A1}$ and a total number of moles of the multivalent alcohol contained in the polyol component is $C_B$, the molar ratio ($C_{A1}/C_B$) is 0.1 to 150:

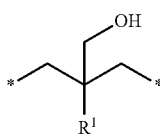

(a-1)

in Formula (a-1), * indicates a bond to a carbonate group.

12. The urethane resin according to claim 10,
wherein the polyol component further includes a compound (A-2) represented by the following Formula (A-2) and a compound (A-3) represented by the following Formula (A-3):

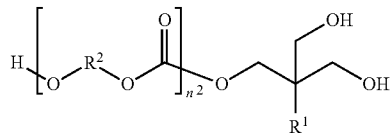

(A-2)

in Formula (A-2), $R^1$ represents a hydrogen atom or an alkyl group, $R^2$ represents an alkanediyl group, $n^2$ represents an integer of 1 or more; and when there are 2 or more $n^2$'s, the plurality of $R^2$'s may be the same as or different from each other, and

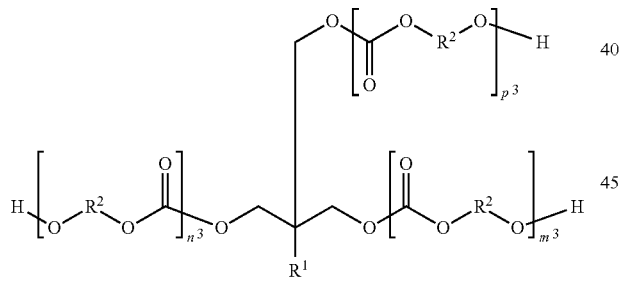

(A-3)

in Formula (A-3), $R^1$ represents a hydrogen atom or an alkyl group, $R^2$ represents an alkanediyl group, $n^3$, $m^3$ and $p^3$ each represent an integer of 1 or more; and a plurality of $R^2$'s may be the same as or different from each other.

13. The urethane resin according to claim 10,
wherein, when a total number of moles of the group represented by the following Formula (a-1) contained in the polyol component is $C_{A1}$ and a total number of moles of the group represented by the following Formula (I) contained in the polyol component is $C_T$, the molar ratio ($C_{A1}/C_T$) is 0.10 to 0.99:

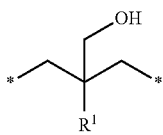

(a-1)

in Formula (a-1), * indicates a bond to a carbonate group, and

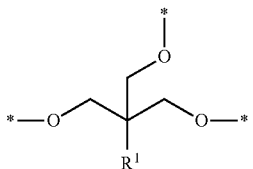

(I)

in Formula (I), $R^1$ represents a hydrogen atom or an alkyl group, and * indicates a bond.

14. The urethane resin according to claim 10,
wherein, when a total number of moles of the multivalent alcohol contained in the polyol component is $C_B$ and a total number of moles of the group represented by the following Formula (I) contained in the polyol component is $C_T$, the molar ratio ($C_B/C_T$) is 0.001 to 0.900:

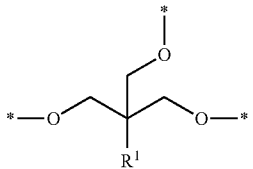

(I)

in Formula (I), $R^1$ represents a hydrogen atom or an alkyl group, * indicates a bond.

15. The polycarbonate polyol according to claim 1,
wherein n and m each represent an integer of 2 or more and 65 or less.

* * * * *